US012476137B2

United States Patent
Lu et al.

(10) Patent No.: US 12,476,137 B2
(45) Date of Patent: Nov. 18, 2025

(54) METHOD TO ENLARGE AN OPENING IN AIR GAP FORMATION

(71) Applicant: TAIWAN SEMICONDUCTOR MANUFACTURING COMPANY, LTD., Hsinchu (TW)

(72) Inventors: Lin-Chen Lu, Kaohsiung (TW); Tsung-Han Tsai, Miaoli (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 557 days.

(21) Appl. No.: 17/889,894

(22) Filed: Aug. 17, 2022

(65) Prior Publication Data
US 2024/0063126 A1     Feb. 22, 2024

(51) Int. Cl.
*H01L 21/768*  (2006.01)
*H01L 23/522*  (2006.01)
*H01L 23/528*  (2006.01)
*H01L 23/532*  (2006.01)

(52) U.S. Cl.
CPC .... *H01L 21/7682* (2013.01); *H01L 21/76814* (2013.01); *H01L 21/76826* (2013.01); *H01L 21/76828* (2013.01); *H01L 23/5222* (2013.01); *H01L 23/5283* (2013.01); *H01L 23/53295* (2013.01); *H01L 21/76832* (2013.01); *H01L 2221/1063* (2013.01)

(58) Field of Classification Search
CPC ........... H01L 21/7682; H01L 21/76814; H01L 21/76826; H01L 23/53295; H01L 2221/1063
See application file for complete search history.

(56) References Cited

U.S. PATENT DOCUMENTS

| | | | | |
|---|---|---|---|---|
| 8,241,992 B2 * | 8/2012 | Clevenger | ......... | H01L 21/76835 438/669 |
| 10,157,778 B2 * | 12/2018 | Tsai | .................... | H01L 23/5283 |
| 10,204,999 B2 | 2/2019 | Lee et al. | | |
| 10,211,146 B2 * | 2/2019 | He | ...................... | H01L 21/7682 |
| 11,270,945 B2 * | 3/2022 | Chang | .................... | H10D 30/60 |
| 11,335,638 B2 | 5/2022 | Singh et al. | | |
| 11,705,396 B2 * | 7/2023 | McGahay | ........... | H01L 21/7682 257/522 |
| 12,142,519 B2 * | 11/2024 | Wang | ................ | H01L 23/53295 |
| 2012/0037952 A1 | 2/2012 | Lin et al. | | |
| 2012/0104512 A1 | 5/2012 | Horak et al. | | |
| 2020/0395459 A1 | 12/2020 | Singh et al. | | |
| 2022/0139762 A1 * | 5/2022 | Li | ..................... | H01L 21/02063 257/774 |
| 2022/0395459 A1 | 12/2022 | Karve et al. | | |

* cited by examiner

*Primary Examiner* — Daniel Luke
(74) *Attorney, Agent, or Firm* — NZ Carr Law Office

(57) ABSTRACT

A semiconductor device structure and methods of forming the same are described. In some embodiments, the structure includes a device and a first dielectric layer disposed over the device. An airgap is located in the first dielectric layer. The structure further includes a conductive feature disposed in the first dielectric layer, and the first dielectric layer includes a first portion disposed between the airgap and a first side of the conductive feature and a second portion disposed adjacent a second side of the conductive feature opposite the first side. The first portion has a first nitrogen concentration, and the second portion has a second nitrogen concentration substantially less than the first nitrogen concentration.

20 Claims, 22 Drawing Sheets

METHOD TO ENLARGE AN OPENING IN AIR GAP FORMATION

BACKGROUND

A semiconductor device, such as a metal-oxide-semiconductor field-effect transistor (MOSFET), has an off-state capacitance while in an off state. The off-state capacitance includes a device capacitance and a wiring capacitance. The device capacitance is caused by the capacitances between layers of the device. The wiring capacitance is caused by the capacitances between conductive features and between conductive feature and the device. High off-state capacitances increase time delay and decrease switching performance of the semiconductor arrangement.

Therefore, an improved semiconductor device structure is needed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
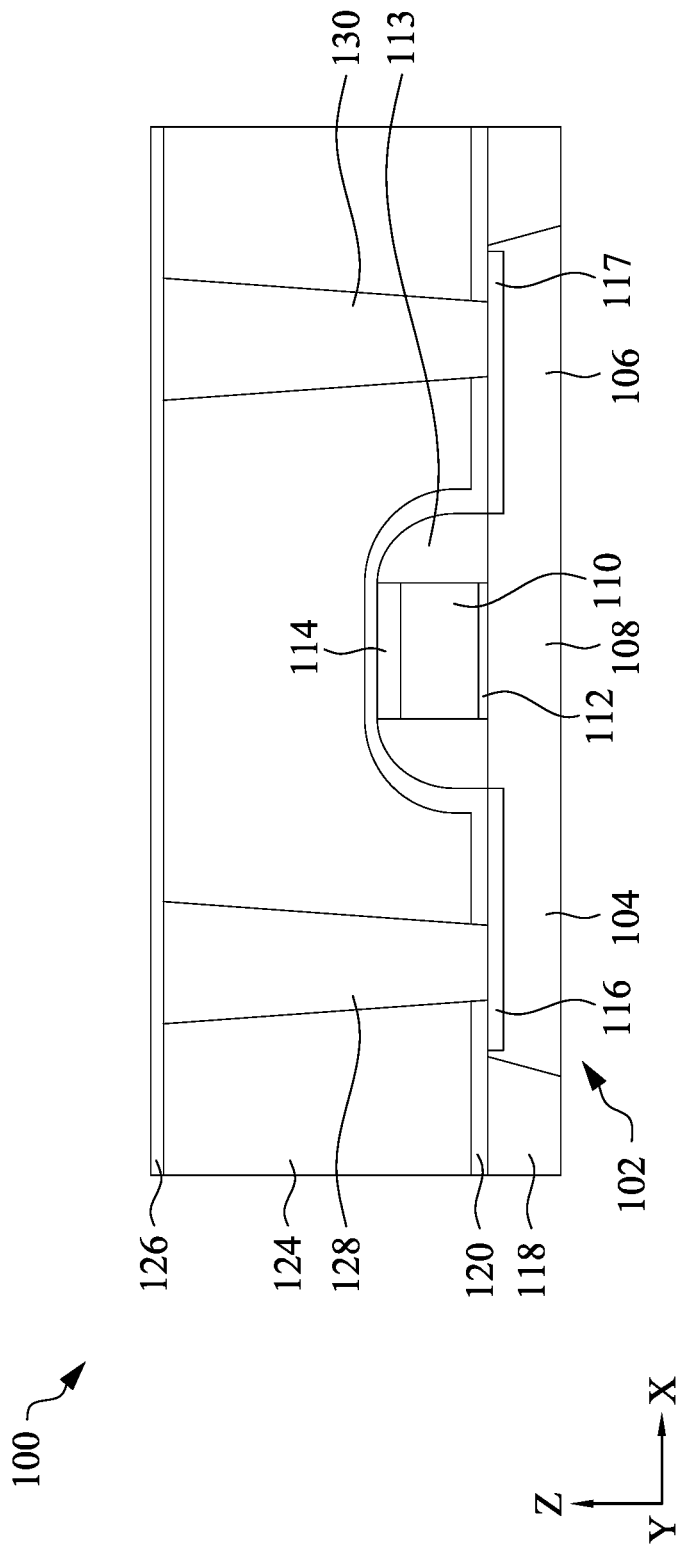
FIG. 1A-1I are cross-sectional side views of various stages of manufacturing a semiconductor device structure, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "over," "on," "top," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIGS. 1A-1I show exemplary sequential processes for manufacturing a semiconductor device structure 100, in accordance with some embodiments. It is understood that additional operations can be provided before, during, and after processes shown by FIGS. 1A-1I and some of the operations described below can be replaced or eliminated, for additional embodiments of the method. The order of the operations/processes may be interchangeable.

As shown in FIG. 1A, the semiconductor device structure 100 includes a device 102. The device 102 may be any suitable device, such as transistor, diode, imaging sensor, resistor, capacitor, inductor, memory cell, or a combination thereof. In some embodiments, the device 102 is a transistor, such as planar field effect transistor (FET), fin FET (FinFET), nanostructure transistors, or other suitable transistors. The nanostructure transistors may include nanosheet transistors, nanowire transistors, gate-all-around (GAA) transistors, multi-bridge channel (MBC) transistors, or any transistors having the gate electrode surrounding the channels. An example of the device 102 is a MOSFET. The device 102 includes source region 104, a drain region 106, and a channel region 108 located between the source region 104 and the drain region 106. In this disclosure, a source region and a drain region are interchangeably used, and the structures thereof are substantially the same. Furthermore, source/drain region(s) may refer to a source or a drain, individually or collectively dependent upon the context. The source region 104 and the drain region 106 each includes a semiconductor material, such as Si or Ge, a III-V compound semiconductor, a II-VI compound semiconductor, or other suitable semiconductor material. Exemplary source region 104 and drain region 106 may include, but are not limited to, Ge, SiGe, GaAs, AlGaAs, GaAsP, SiP, InAs, AlAs, InP, GaN, InGaAs, InAlAs, GaSb, AlP, GaP, and the like. The source region 104 and the drain region 106 may include p-type dopants, such as boron; n-type dopants, such as phosphorus or arsenic; and/or other suitable dopants including combinations thereof. The channel region 108 may include one or more semiconductor materials, such as Si, Ge, GeSn, SiGe, GaAs, InSb, GaP, GaSb, InAlAs, InGaAs, GaSbP, GaAsSb, GaN, GaP, or InP. The device 102 further includes a gate electrode layer 110 disposed over the channel region 108 and a gate dielectric layer 112 disposed between the gate electrode layer 110 and the channel region 108. The gate electrode layer 110 may be an electrically conductive material such as polysilicon, tungsten, cobalt, titanium, aluminum, ruthenium, copper, multilayers thereof, combinations thereof, alloys thereof, or the like. The gate dielectric layer 112 may include a dielectric material such as an oxygen-containing material or a nitrogen-containing material, a high-k dielectric material having a k value greater than that of silicon dioxide, or multilayers thereof.

As described above, in some embodiments, the device 102 is a FinFET, and the channel region 108 is a fin structure having three sides surrounded by the gate electrode layer 110. In some embodiments, the device 102 is a nanostructure transistor, and the channel region 108 is surrounded by the gate electrode layer 110.

The device 102 further includes gate spacers 113 disposed along sidewalls of the gate electrode layer 110. The gate spacers 113 may include silicon oxycarbide, silicon nitride, silicon oxynitride, silicon carbon nitride, the like, multi-layers thereof, or a combination thereof. A cap layer 114 is disposed on the gate electrode layer 110, and the cap layer 114 may include nickel silicide (NiSi) or other suitable material. Silicide layers 116, 117 are disposed on the source region 104 and drain region 106, respectively. The silicide layers 116, 117 may include any suitable silicide, such as NiSi. Portions of the device 102, such as the source region 104, the drain region 106, and the channel region 108, may be disposed between isolation structures 118, such as shallow trench isolation (STI) region. The isolation structure 118 may include an electrically insulating material such as an oxygen-containing material, a nitrogen-containing material, or a combination thereof. The isolation structures 118 electrically isolate adjacent devices 102.

An etch stop layer 120 is disposed over the isolation structures 118, the silicide layers 116, 117, the gate spacers 113, and the cap layer 114. The etch stop layer may include an oxygen-containing material, a carbon-containing material, or a nitrogen-containing material, such as silicon nitride, silicon carbide, silicon carbon nitride, silicon oxynitride, carbon nitride, silicon oxide, silicon carbon oxide, or the like, or a combination thereof, and may be deposited by CVD, PECVD, ALD, or any suitable deposition technique. The etch stop layer 120 may be conformally deposited on the exposed surfaces of the semiconductor device structure 100. The term "conformal" may be used herein for ease of description upon a layer having substantial same thickness over various regions. In some embodiments, the etch stop layer 120 is a multilayer structure.

As shown in FIG. 1A, a dielectric layer 124 is disposed over the etch stop layer 120. The dielectric layer 124 may be an interlayer dielectric (ILD) layer. The dielectric layer 124 may include an oxide formed by tetraethylorthosilicate (TEOS), un-doped silicate glass, or doped silicon oxide such as fluorine doped silicon oxide, phosphorous doped silicon oxide, borophosphosilicate glass (BPSG), fused silica glass (FSG), phosphosilicate glass (PSG), boron doped silicon glass (BSG), organosilicate glass (OSG), SiOC, and/or any suitable low-k dielectric materials (e.g., a material having a dielectric constant lower than that of silicon dioxide), and may be deposited by spin-on, CVD, FCVD, PECVD, PVD, or any suitable deposition technique. In some embodiments, the dielectric layer 124 includes silicon oxide, silicon nitride, silicon carbide, silicon oxycarbide, silicon oxynitride, silicon oxycarbonnitride, or other suitable material.

As shown in FIG. 1A, conductive contacts 128, 130 are disposed in the dielectric layer 124 and over the source region 104 and the drain region 106, respectively. Openings may be first formed in the dielectric layer 124 and the etch stop layer 120, and the conductive contacts 128, 130 are then formed in the openings. The conductive contacts 128, 130 are in contact with the silicide layers 116, 117, respectively. The conductive contacts 128, 130 each includes an electrically conductive material having one or more of Ru, Mo, Co, Ni. W, Ti, Ta, Cu, Al, TiN or TaN, and the conductive contacts 128, 130 may be formed by any suitable method, such as electro-chemical plating (ECP) or PVD. A conductive contact (not shown) may be formed in the dielectric layer 124 and the etch stop layer 120, and the conductive contact is in contact with the cap layer 114. The conductive contacts 128, 130 and the conductive contact (not shown) are electrically connected to the source region 104, the drain region 106, and the gate electrode layer 110, respectively.

As shown in FIG. 1A, an etch stop layer 126 is disposed on the dielectric layer 124 and the conductive contacts 128, 130. The etch stop layer 126 includes an oxygen-containing material, a carbon-containing material, or a nitrogen-containing material, such as silicon nitride, silicon carbide, silicon carbon nitride, silicon oxynitride, carbon nitride, silicon oxide, silicon carbon oxide, or the like, or a combination thereof, and may be deposited by CVD, PECVD, ALD, or any suitable deposition technique.

Figure 1B:
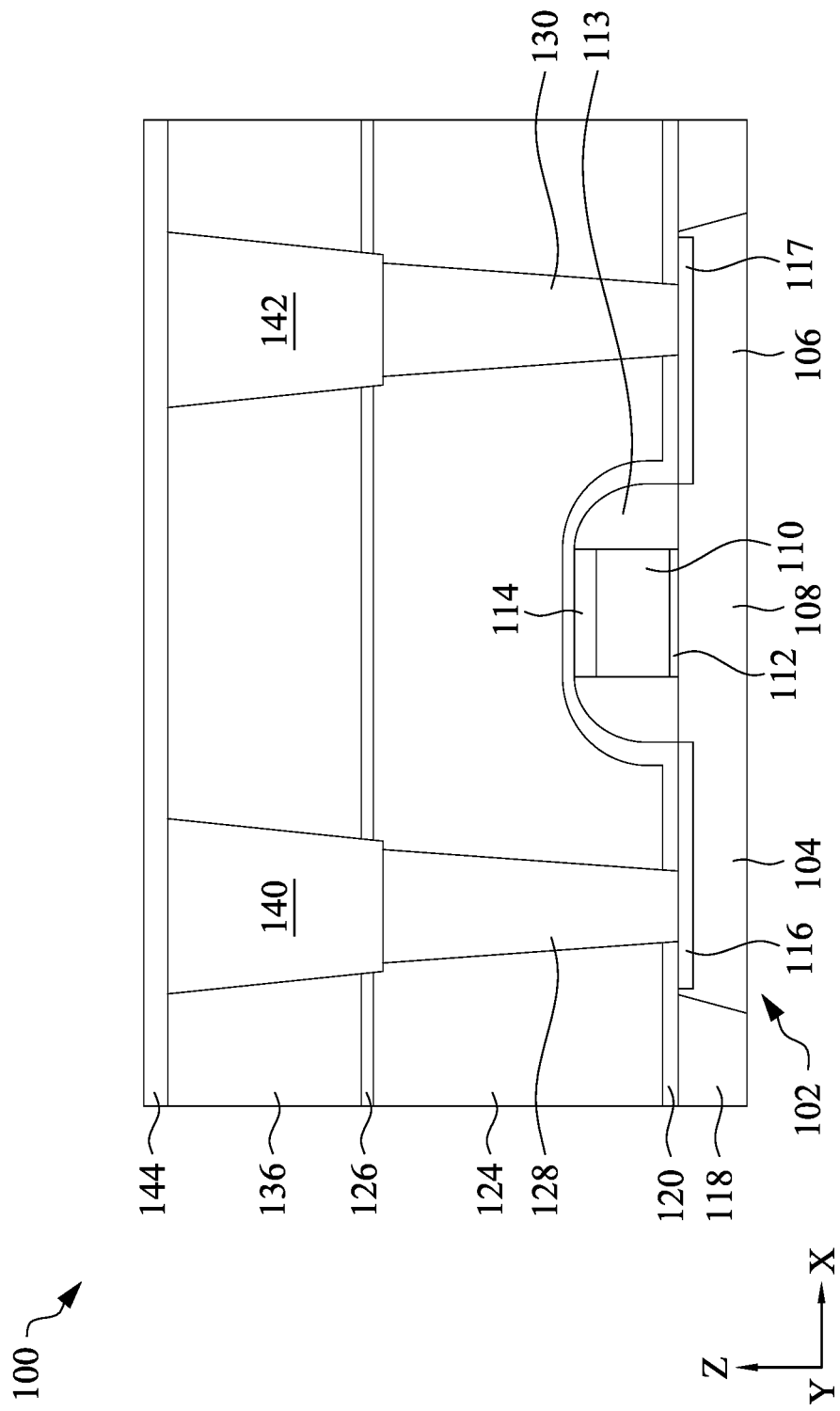

As shown in FIG. 1B, a dielectric layer 136 is disposed on the etch stop layer 126. The dielectric layer 136 may be an intermetal dielectric (IMD) layer. The dielectric layer 136 may include an oxide formed by TEOS, un-doped silicate glass, or doped silicon oxide such as fluorine doped silicon oxide, phosphorous doped silicon oxide, borophosphosilicate glass (BPSG), fused silica glass (FSG), phosphosilicate glass (PSG), boron doped silicon glass (BSG), organosilicate glass (OSG), SiOC, and/or any suitable low-k dielectric materials (e.g., a material having a dielectric constant lower than that of silicon dioxide), and may be deposited by spin-on, CVD, FCVD, PECVD, PVD, or any suitable deposition technique. In some embodiments, the dielectric layer 136 includes silicon oxide, silicon nitride, silicon carbide, silicon oxycarbide, silicon oxynitride, silicon oxycarbonnitride, or other suitable material. In some embodiments, the dielectric layer 136 and the dielectric layer 124 include different dielectric materials and have different etch rates during an etch process.

As shown in FIG. 1B, conductive features 140, 142 are disposed in the dielectric layer 136 and over the conductive contacts 128, 130, respectively. Openings may be first formed in the dielectric layer 136 and the etch stop layer 126, and the conductive features 140, 142 are then formed in the openings. The conductive features 140, 142 may be in contact with the conductive contacts 128, 130, respectively. The conductive features 140, 142 each includes an electrically conductive material having one or more of Ru, Mo, Co, Ni. W, Ti, Ta, Cu, Al, TiN or TaN, and the conductive features 140, 142 may be formed by any suitable method, such as ECP or PVD. In some embodiments, each conductive feature 140, 142 includes one or more layers (not shown), such as a barrier layer and a liner, disposed between the dielectric layer 136 and the electrically conductive material. For example, a barrier layer may be first formed in each opening, a liner may be formed on the barrier layer, and the electrically conductive material is formed on the liner. In some embodiments, the barrier layer is in contact with the conductive contacts 128, 130.

An etch stop layer 144 is formed on the dielectric layer 136 and the conductive features 140, 142, as shown in FIG. 1B. The etch stop layer 144 may include the same material as the etch stop layer 126 and may be formed by the same process as the etch stop layer 126.

Figure 1C:
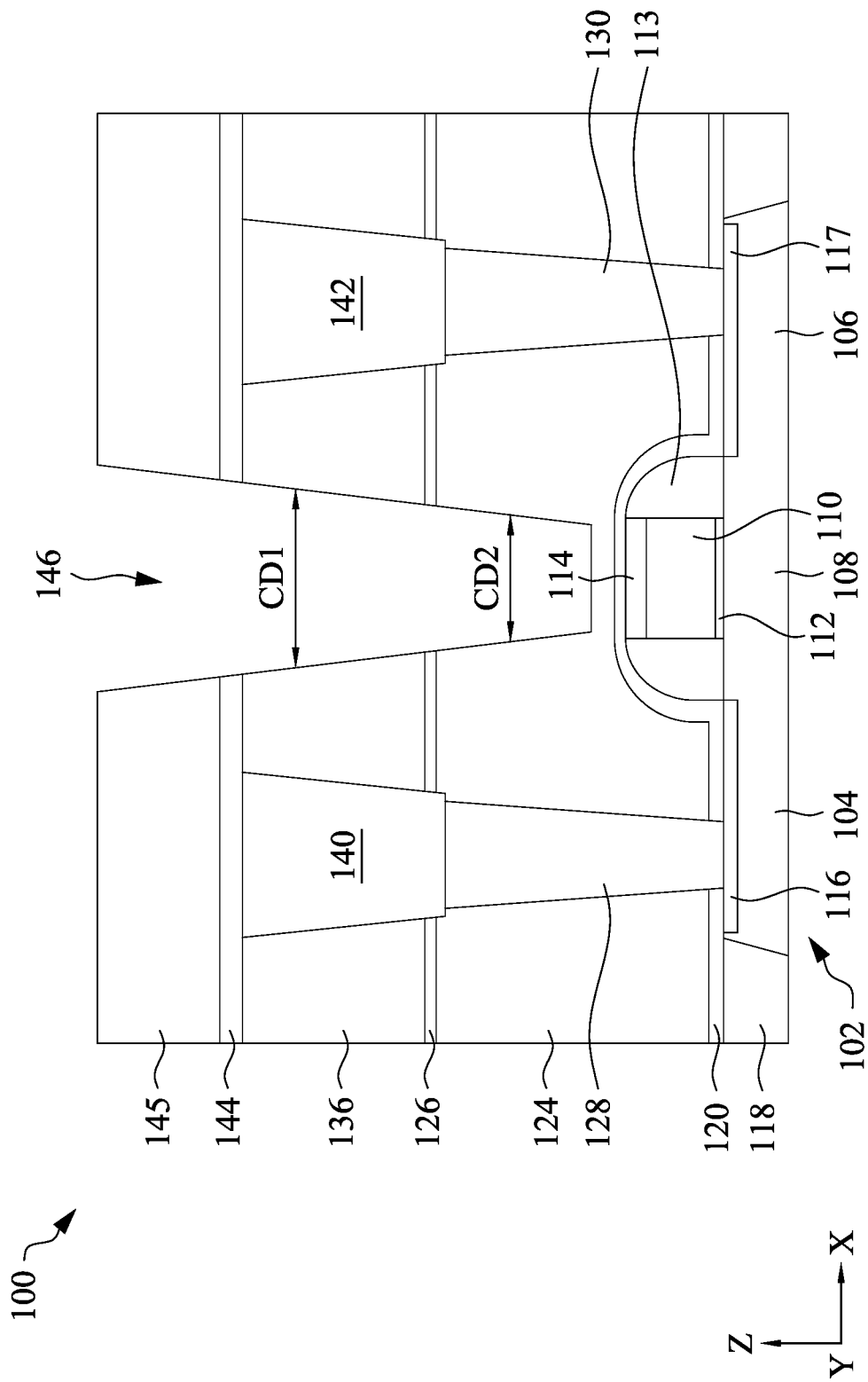

As shown in FIG. 1C, an opening 146 is formed in the dielectric layers 136, 124. The opening 146 is formed by one or more etch processes, such as one or more dry etch processes. The opening 146 is formed in the etch stop layer 144, the dielectric layer 136, the etch stop layer 126, and the dielectric layer 124. In some embodiments, because the materials of the etch stop layer 144, the dielectric layer 136, the etch stop layer 126, and the dielectric layer 124 have different etch selectivity, multiple etch processes are performed to form the opening 146. For example, in some embodiments, the opening 146 is formed by forming a mask layer 145 formed on the etch stop layer 144, patterning the mask layer 145 to expose a portion of the etch stop layer 144, removing the exposed portion of the etch stop layer 144 by a first etch process to expose a portion of the dielectric layer 136, removing the exposed portion of the dielectric layer 136 by a second etch process to expose a portion of the etch stop layer 126, removing the exposed portion of the etch stop layer 126 by a third etch process to expose a portion of the dielectric layer 124, and removing the exposed portion of the dielectric layer 124 by a fourth etch process. In some embodiments, the first, second, third, and fourth etch processes are dry etch processes, such as plasma etch processes. As a result of the multiple dry etch processes, the opening 146 may have substantial straight sidewalls, such as vertical or tapered sidewalls. In some embodiments, the sidewalls of the opening 146 may be slightly curved. In some embodiments, a single dry etch process may be performed to remove the portions of the etch stop layer 144, the dielectric layer 136, the etch stop layer 126, and the dielectric layer 124.

In some embodiments, as shown in FIG. 1C, the opening 146 has gradually decreasing critical dimension along the x-axis as a result of the tapered sidewalls from the etch processes. Generally speaking, the portion of the opening 146 in the dielectric layer 136 has a first critical dimension CD1, and the portion of the opening 146 in the dielectric layer 124 has a second critical dimension CD2 substantially less than the first critical dimension CD1.

Figure 1D:
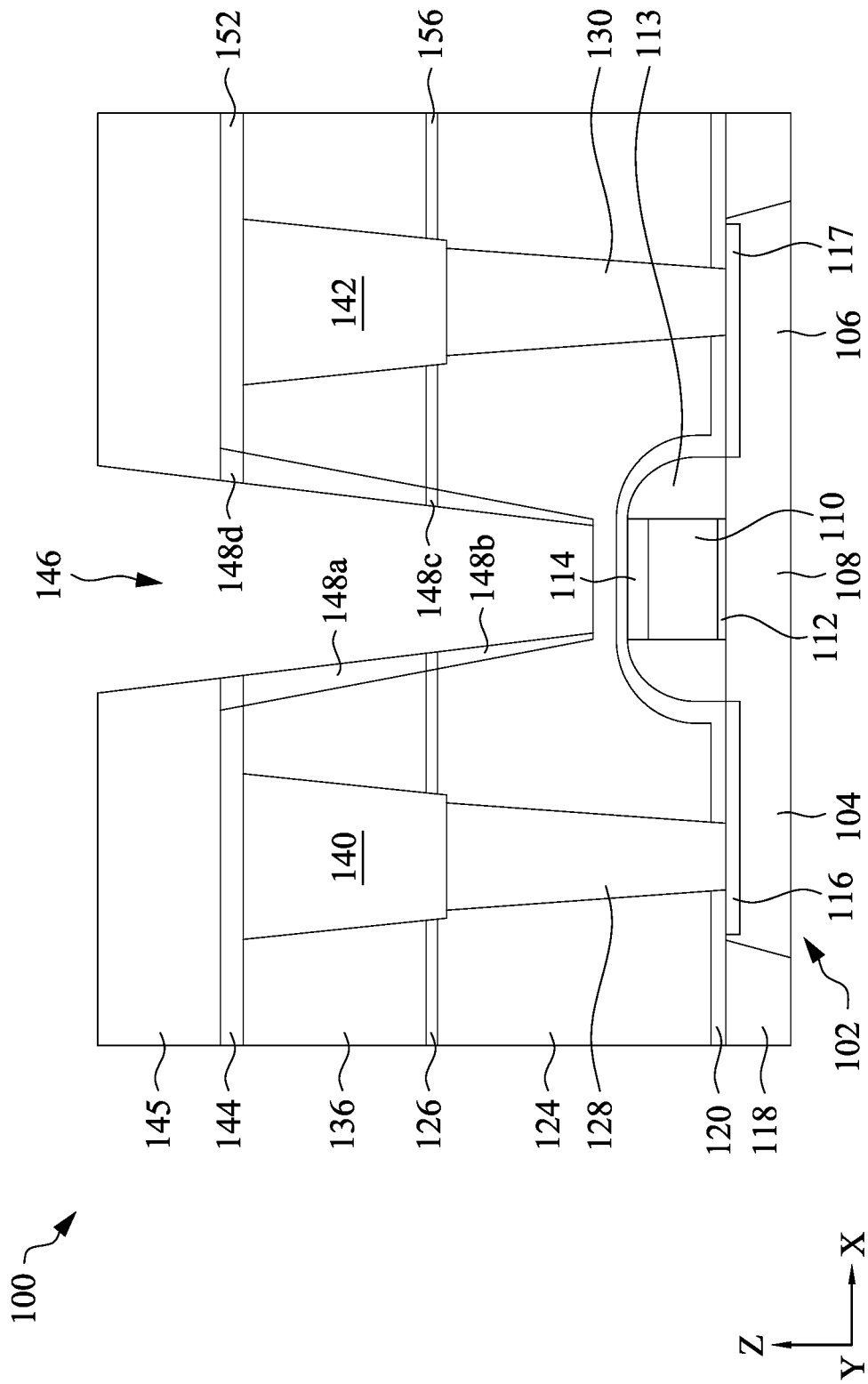

As shown in FIG. 1D, a treatment process is performed to covert at least a portion of the exposed surfaces of the dielectric layer 136, the dielectric layer 124, the etch stop layer 126, and the etch stop layer 144 in the opening 146 to nitride layers 148a, 148b, 148c, 148d, respectively. The nitride layers 148a-d may be collectively referred to as the nitride layer 148. The treatment process may be a thermal or plasma treatment process, and the semiconductor device structure 100 is exposed to a nitrogen-containing gas during the treatment process. The treatment process may be performed at a temperature ranging from about 20 degrees Celsius to about 450 degrees Celsius. The treatment process does not deposit a layer on the exposed surfaces of the semiconductor device structure 100. In some embodiments, the dielectric layers 136, 124 are both made of oxides, and the treatment process converts at least a portion of the exposed surfaces of the dielectric layers 136, 124 to nitrides, such as oxynitrides. In some embodiments, the nitride layers 148a, 148b include SiON. The thickness of the nitride layer 148 along the x-axis decreases in a direction from the top of opening 146 to the bottom of the opening 146, because there is more nitrogen-containing gas at the top of the opening 146 than at the bottom of the opening 146. For example, the thickness of the nitride layer 148a is substantially greater than the thickness of the nitride layer 148b. Furthermore, the bottom of the opening may not be converted to a nitride, because the nitrogen-containing gas may not reach the bottom of the opening 146.

In some embodiments, the etch stop layers 126, 144 are made of silicon nitride, and the treatment process increases the nitrogen concentration in the exposed portions of the etch stop layers 126, 144. For example, after the treatment process, the etch stop layer 126 includes a first portion, which is the nitride layer 148c, having a first nitrogen concentration and a second portion 156 having a second nitrogen concentration substantially less than the first nitrogen concentration of the nitride layer 148c. The etch stop layer 144 includes a first portion, which is the nitride layer 148d, having a first nitrogen concentration and a second portion 152 having a second nitrogen concentration substantially less than the first nitrogen concentration of the nitride layer 148d.

As described above, the thickness of the nitride layer 148 decreases in a direction from the top of the opening 146 to the bottom of the opening 146. Thus, in some embodiments, the thickness of the nitride layer 148d along the x-axis is substantially greater than the thickness of the nitride layer 148a along the x-axis, which is substantially greater than the thickness of the nitride layer 148c along the x-axis, which is substantially greater than the thickness of the nitride layer 148b along the x-axis.

In some embodiments, the dielectric layer 124 and the dielectric layer 136 include different materials (including same material with different compositions) having different etch rates during an etch process. For example, the dielectric layer 124 and the dielectric layer 136 both include silicon oxide, and the silicon concentrations in the dielectric layer 124 and the dielectric layer 136 may be different. In some embodiments, the dielectric layer 136 may have a faster etch rate than the dielectric layer 124 during an etch process. As a result, more of the dielectric layer 136 may be removed than the dielectric layer 124 in an etch process. With the large critical dimension CD1 (FIG. 1C) and the faster etch rate, the dielectric layer 136 may be removed to expose the conductive features 140, 142 during the etch process, which may cause the conductive features 140, 142 to peel. Thus, in order to protect the conductive features 140, 142 during the subsequent etch process, the nitride layer 148 having varying thickness is utilized. The nitride layer 148a is substantially thicker than the nitride layer 148b, and it takes longer to remove the nitride layer 148a than the nitride layer 148b during the etch process. As a result, the portions of the dielectric layer 136 in contact with the conductive features 140, 142 are not removed, and the conductive features 140, 142 are not exposed to the etchant.

Figure 1E:
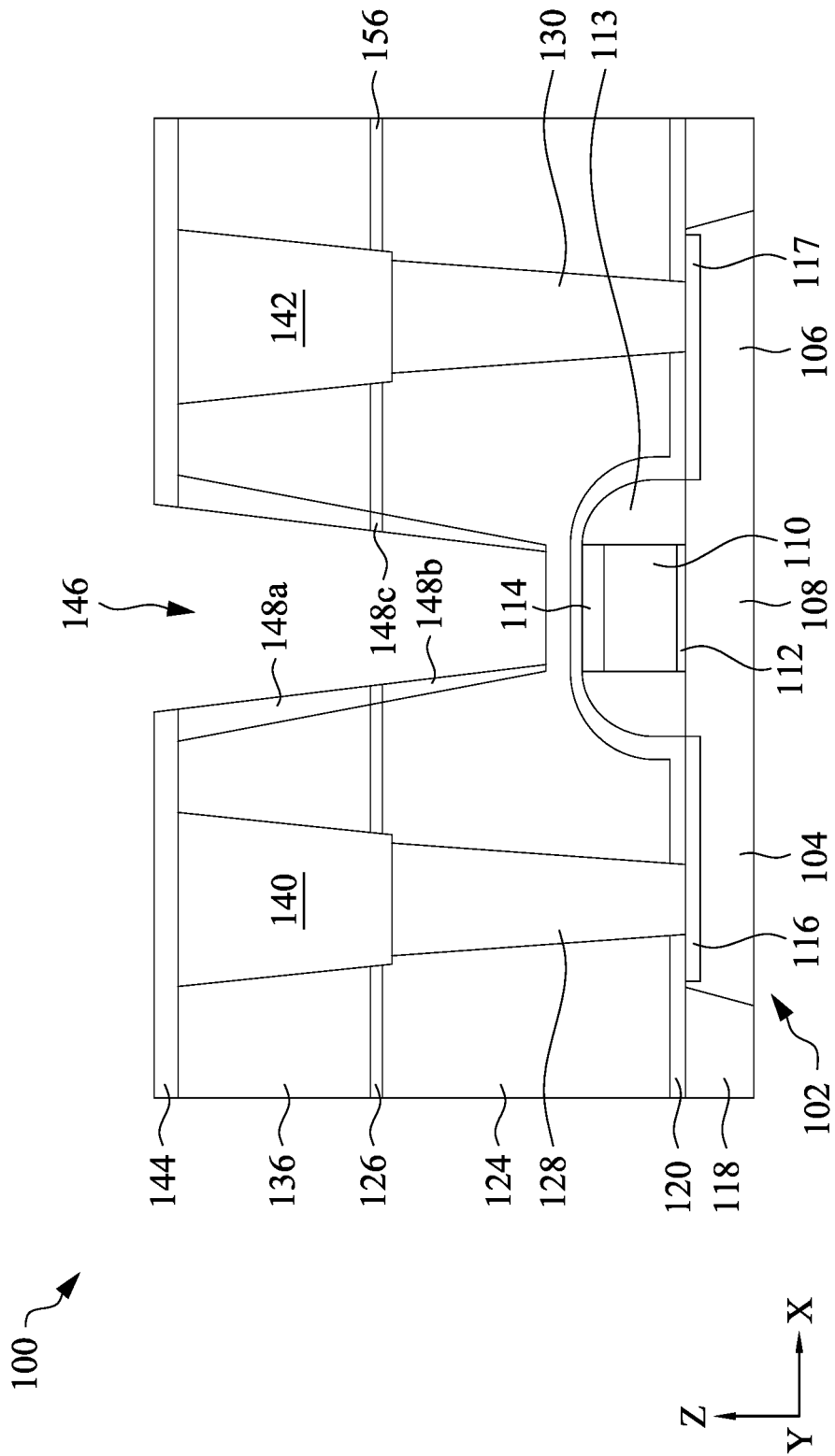

In some embodiments, as shown in FIG. 1E, the mask layer 145 is removed prior to the treatment process. The etch stop layer 144 is exposed to the nitrogen-containing gas during the treatment process, and the nitrogen concentration in the etch stop layer 144 is increased. The nitride layer 148 includes the nitride layers 148a, 148b, 148c, and the thickness of the nitride layer 148 along the x-axis decreases in the direction from the top of the opening 146 to the bottom of the opening 146.

Figure 1F:
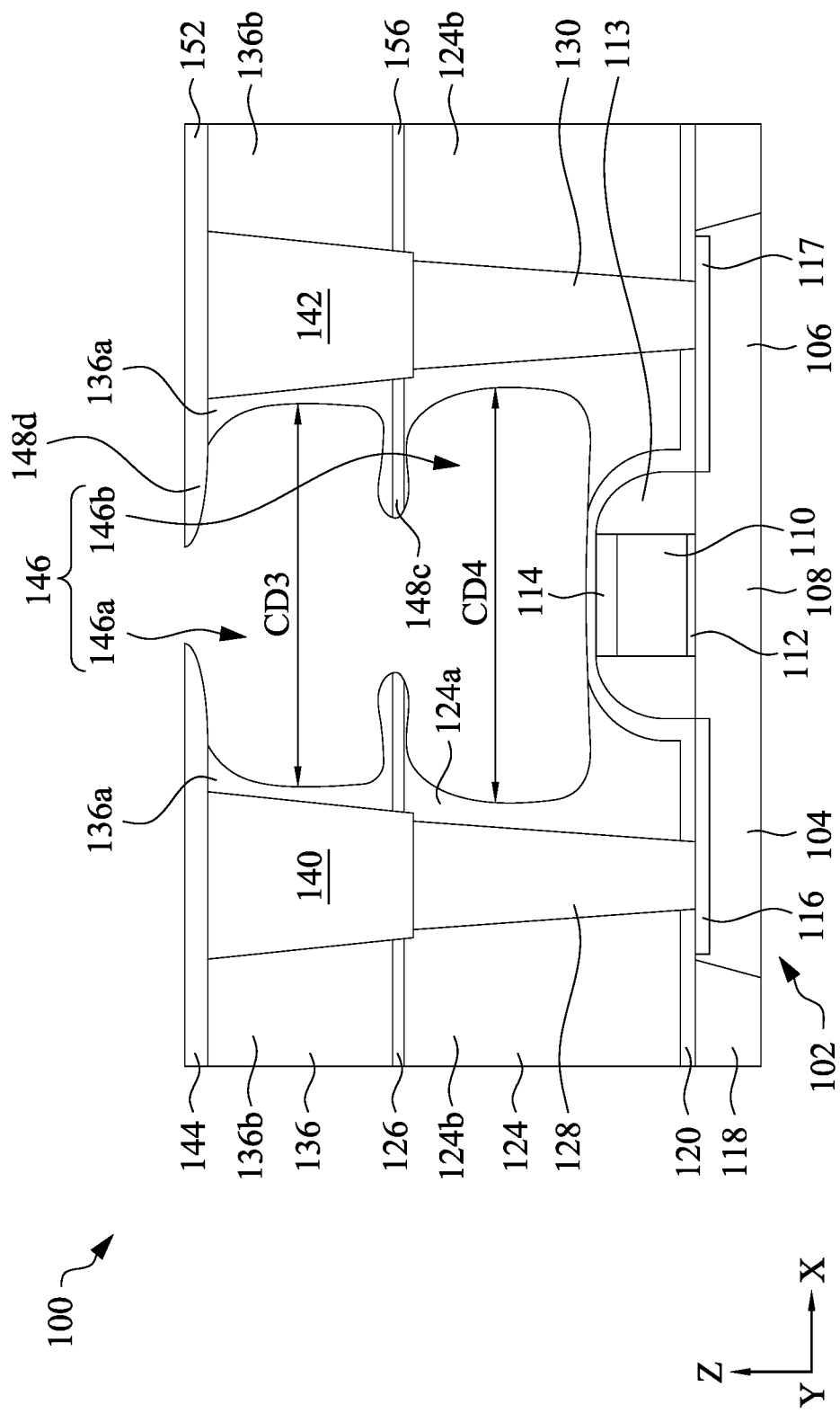

As shown in FIG. 1F, after the treatment process to form the nitride layer 148, an etch process is performed to enlarge the opening 146 in the dielectric layers 124, 136. In some embodiments, the etch process is a wet etch process. The dielectric layer 136 may have a faster etch rate during the wet etch process than the etch rate of the dielectric layer 124. The etchant, such as dilute HF, of the wet etch process removes the nitride layer 148b before removing the nitride layer 148a, as a result of the thicker nitride layer 148a. As a result, the opening 146 includes a portion 146a formed in the dielectric layer 136 and a portion 146b formed in the dielectric layer 124 after the wet etch process. As shown in FIG. 1F, portions 136a of the dielectric layer 136 in contact with the conductive features 140, 142 are not removed by the wet etch process, and the conductive features 140, 142 are protected from the etchant by the portions 136a of the dielectric layer 136.

In addition to having protected the conductive features 140, 142, the portion 146b of the opening 146 is also enlarged to further reduce the device off-state capacitance. Because the dielectric layer 124 has a slower etch rate compared to the dielectric layer 136 during the wet etch process, the portion 146b of the opening 146 may be substantially smaller than the portion 146a of the opening 146, if the nitride layers 148a, 148b are not present. With the nitride layers 148a, 148b, the portion 146a of the opening 146 has a critical dimension CD3, and the portion 146b of the opening 146 has a critical dimension CD4 substantially the same as the critical dimension CD3, as shown in FIG. 1F. In some embodiments, the portions 136a of the dielectric layer 136 located between the portion 146a of the opening 146 and the conductive features 140, 142 may each include a small amount of nitrogen as a result of the treatment process, while portions 136b of the dielectric layer 136 located on the other side of the conductive features 140, 142 are substantially free of nitrogen. In other words, the portion 136a has a first nitrogen concentration, and the portion 136b has a second nitrogen concentration substantially less than the first nitrogen concentration. Similarly, in some embodiments, portions 124a of the dielectric layer 124 located between the portion 146b of the opening 146 and the conductive contacts 128, 130 may each include a small amount of nitrogen as a result of the treatment process, while portions 124b of the dielectric layer 124 located on the other side of the conductive contacts 128, 130 are substantially free of nitrogen. In other words, the portion 124a has a first nitrogen concentration, and the portion 124b has a second nitrogen concentration substantially less than the first nitrogen concentration.

As shown in FIG. 1F, the etch process to enlarge the opening 146 to form the portions 146a, 146b does not substantially affect the etch stop layers 126, 144. In some embodiments, the etch stop layer 126 includes the first portion, which is the nitride layer 148c, and the second portion 156 having a different composition (i.e., lower nitrogen concentration) as the first portion. Similarly, the etch stop layer 144 includes the first portion, which is the nitride layer 148d, and the second portion 152 having a different composition (i.e., lower nitrogen concentration) as the first portion. In some embodiments, the etch stop layer 144 and the etch stop layer 126 both includes SiN, and the etch stop layer 144 has a higher nitrogen concentration than the etch stop layer 126 as a result of the treatment process (without the mask layer 145). The etch stop layer 126 includes the first portion, which is the nitride layer 148c, and the second portion 156 having a different composition as the first portion.

Figure 1G:
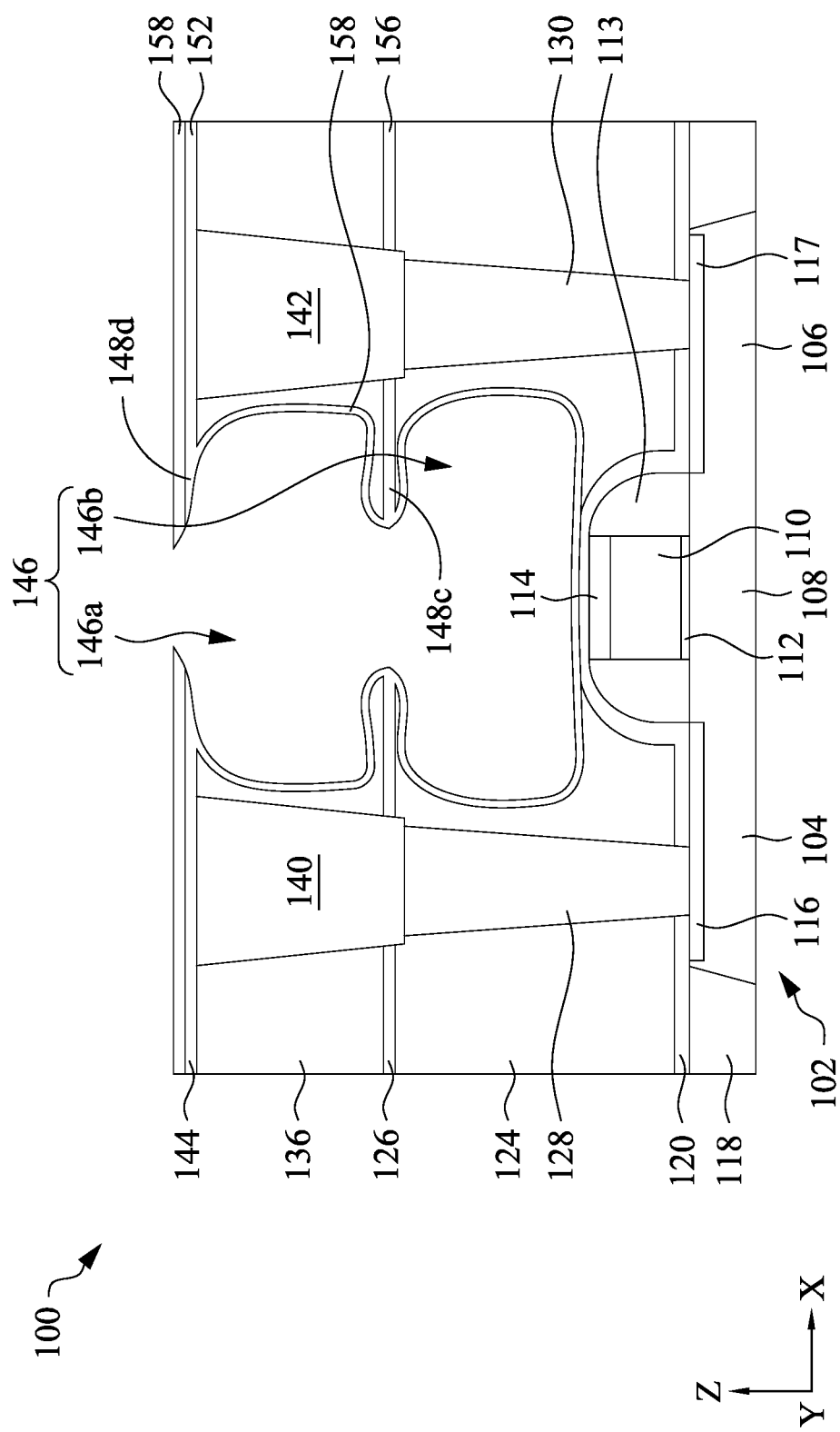

As shown in FIG. 1G, a liner 158 is formed on the exposed surfaces of the semiconductor device structure 100. The liner 158 is formed on the etch stop layer 144 and in the opening 146. For example, the liner 158 is disposed on the etch stop layer 144, the dielectric layer 136, the etch stop layer 126, and the dielectric layer 124. The liner 158 may include the same material as the etch stop layer 144 prior to the treatment process. In some embodiments, the liner 158 includes SiN, SiC, SiON, SiONC, or other suitable material. The liner 158 may be a conformal layer and formed by a conformal process, such as ALD. As shown in FIG. 1G, the semiconductor device structure 100 includes the etch stop layer 144 including the first portion (the nitride layer 148d) and the second portion 152 and the liner 158 disposed on the etch stop layer 144. In some embodiments, the liner 158 includes the same material and composition as the second portion 152. The liner 158 includes the same material (i.e., SiN) as the nitride layer 148d but different composition as the nitride layer 148d (i.e., less nitrogen concentration than the nitride layer 148d). In some embodiments, the liner 158 includes the same material (i.e., SiN) as the etch stop layer 144 but different composition as the etch stop layer 144 (i.e., less nitrogen concentration than the etch stop layer 144).

In some embodiments, the liner 158 is in contact with the first portion, which is the nitride layer 148c, of the etch stop layer 126, and the liner 158 includes the same material (i.e., SiN) as the nitride layer 148c but different composition as the nitride layer 148c (i.e., less nitrogen concentration than the nitride layer 148d).

Figure 1H:
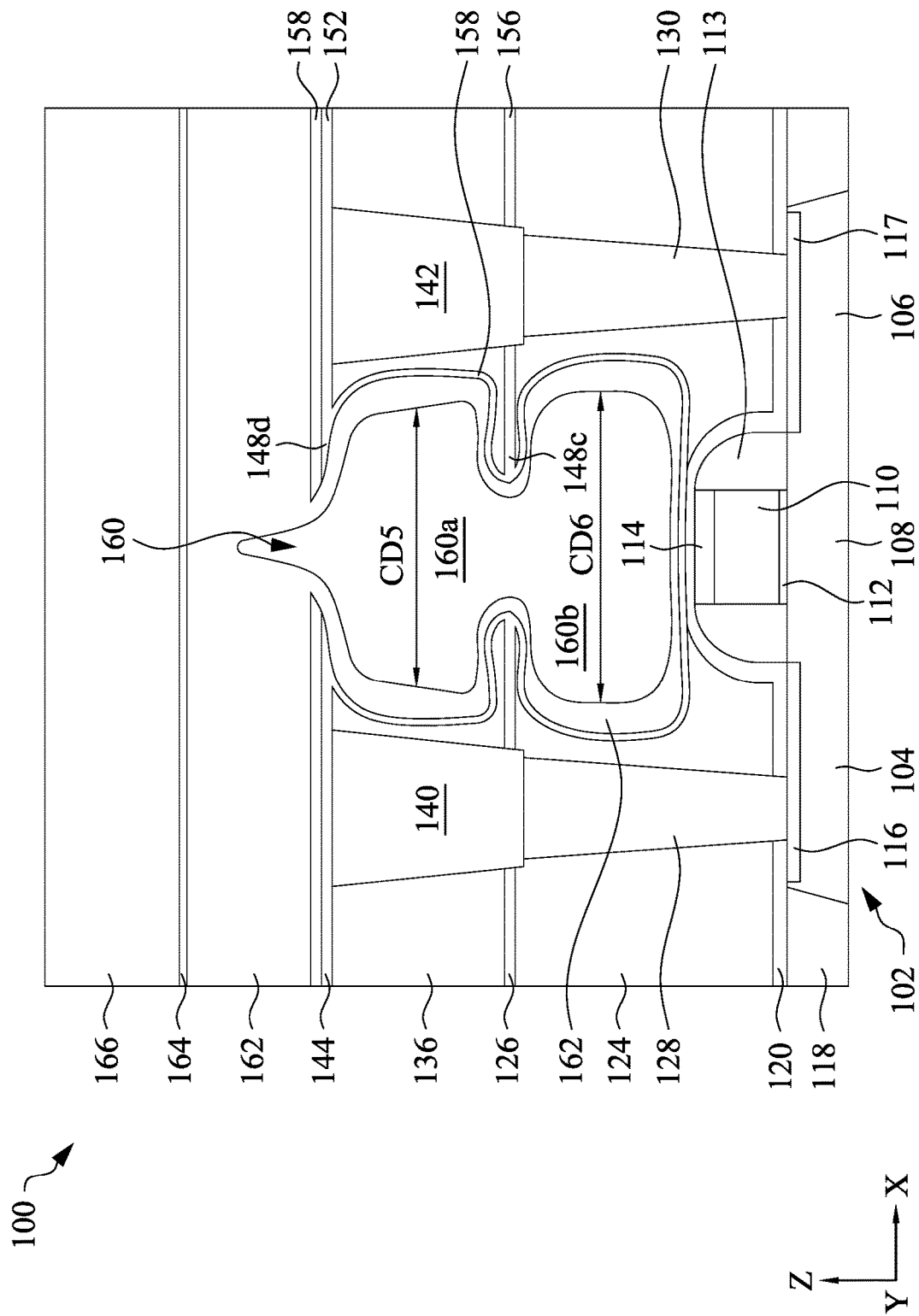

As shown in FIG. 1H, a dielectric layer 162 is formed on the liner 158. The dielectric layer 162 may include the same material as the dielectric layer 136 (prior to the treatment process) and formed by the same process as the dielectric layer 136. In some embodiments, the dielectric layer 162 includes fluorine or phosphorous doped silicon oxide. The dielectric layer 162 may be an IMD layer. The dielectric layer 162 seals off the opening 146 (FIG. 1G) before the opening 146 can be filled with the dielectric layer 162. As a result, a small amount of the dielectric layer 162 may be formed in the opening 146, and an airgap 160, or a void, is defined by the dielectric layer 162 in the opening 146. In some embodiments, the airgap 160 extends into the portions of the dielectric layer 162 disposed over the opening 146, as shown in FIG. 1H. The airgap 160 may include a portion 160a in the dielectric layer 136 and a portion 160b in the dielectric layer 124. The portion 160a has a critical dimension CD5, and the portion 160b has a critical dimension CD6 substantially the same as the critical dimension CD5. The similar critical dimensions CD5, CD6 is a result of having the similar critical dimensions CD3, CD4 (FIG. 1F), which is a result of having the nitride layer 148. The portion 160b of the airgap 160 is enlarged, which leads to reduced off-state capacitance. Furthermore, the conductive features 140, 142 are protected by the portions of the dielectric layer 136.

In some embodiments, as a result of having the airgap 160, wiring capacitances between the conductive contacts 128, 130, between the conductive contact 128 and the gate electrode layer 110, and between the conductive contact 130 and the gate electrode layer 110 are reduced. In addition, wiring capacitance between the conductive features 140, 142 is reduced. Furthermore, wiring capacitances between the conductive feature 140 and the gate electrode layer 110 and between the conductive feature 142 and the gate electrode layer 110 are reduced. An off-state capacitance of the semiconductor device structure 100 is a function of the wiring capacitance and a device capacitance. Thus, with the reduced wiring capacitance, the off-state capacitance of the semiconductor device structure 100 is reduced. In some embodiments, the off-state capacitance of the semiconductor device structure 100 is reduced by more than 40 percent.

As shown in FIG. 1H, an etch stop layer 164 is formed on the dielectric layer 162. The etch stop layer 164 may include the same material as the etch stop layer 144 (prior to the treatment process) and may be formed by the same process as the etch stop layer 144 (without the treatment process). Another dielectric layer 166 is formed on the etch stop layer 164. The dielectric layer 166 may include the same material as the dielectric layer 162 and may be formed by the same process as the dielectric layer 162. In some embodiments, the dielectric layer 166 is an IMD layer.

Figure 1I:
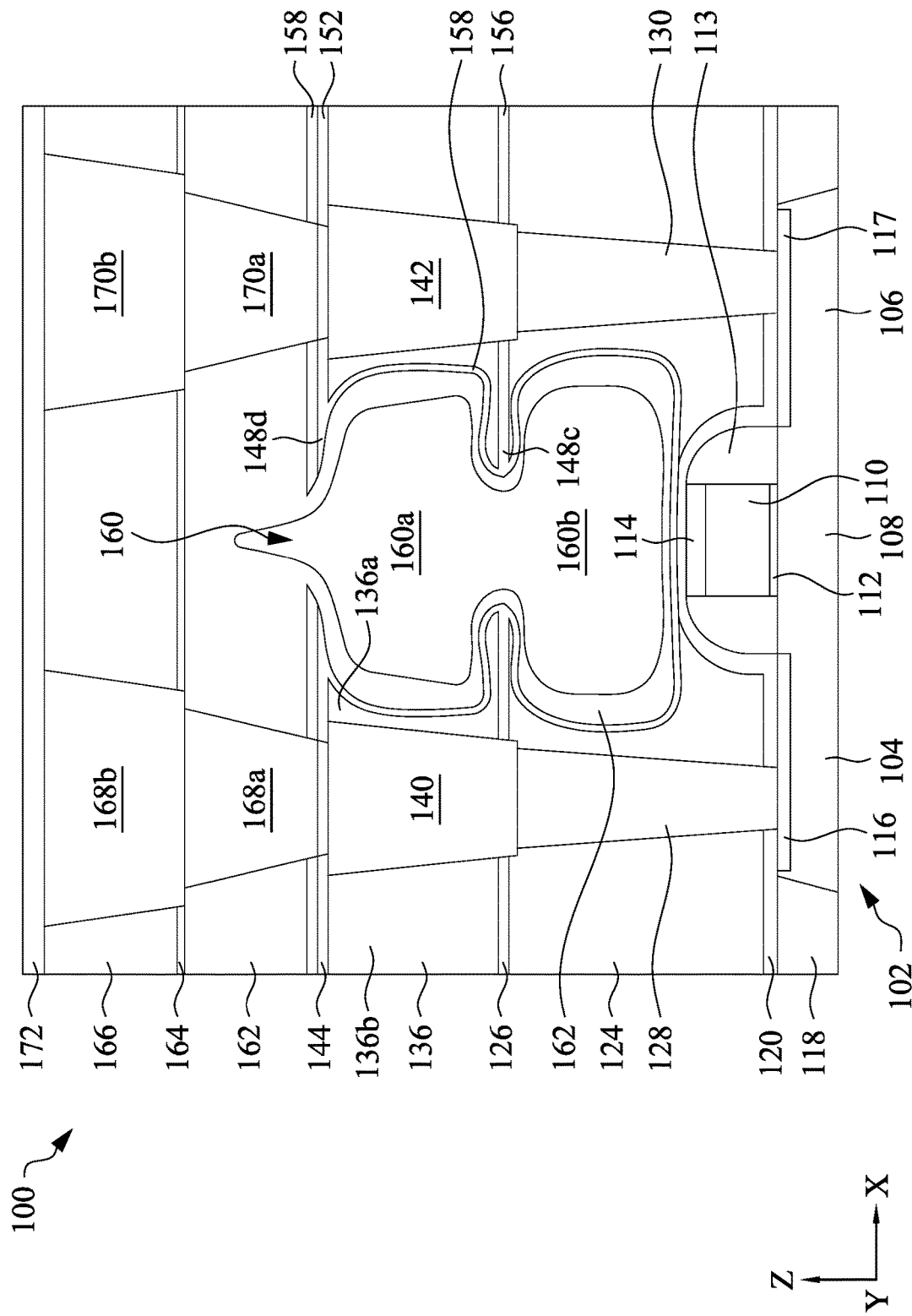

As shown in FIG. 1I, conductive features 168a-b, 170a-b are formed in the dielectric layers 162, 166. In some embodiments, the conductive features 168a, 170a are formed in the dielectric layer 162, and the conductive features 168b, 170b are formed in the dielectric layer 166. The conductive features 168a, 170a may be disposed over the conductive features 140, 142, respectively. The conductive features 168a, 170a may be conductive vias, and the conductive features 168b, 170b may be conductive lines. The conductive features 168a-b, 170a-b each includes an electrically conductive material having one or more of Ru, Mo, Co, Ni. W, Ti, Ta, Cu, Al, TiN or TaN, and the conductive features 168a-b, 170a-b may be formed by any suitable method, such as ECP or PVD. In some embodiments, each conductive feature 168a-b, 170a-b includes one or more layers (not shown), such as a barrier layer and a liner. Another etch stop layer 172 is formed on the dielectric layer 166 and the conductive features 168b, 170b. The etch stop layer 168 may include the same material as the etch stop layer 164 and may be formed by the same process the etch stop layer 164.

Additional dielectric layers may be formed over the etch stop layer 172. The dielectric layers 136, 162, 166, and the additional dielectric layers formed over the dielectric layer 166 may be referred to as an interconnect structure. Conductive features, such as the conductive features 140, 142, 168a-b, 170a-b, may be disposed in the interconnect structure. The airgap 160 may be formed in 1, 2, 3, or more layers of the interconnect structure in order to reduce wiring capacitance of the semiconductor device structure 100. The airgap 160 may be a continuous airgap extending between the adjacent conductive features from the device 102 to the dielectric layer below the topmost dielectric layer of the interconnect structure. In some embodiments, the airgap 160 is formed in one or more layers of the interconnect structure. In some embodiments, discrete airgaps 160 may be formed between adjacent conductive features in one or more dielectric layers of the interconnect structure.

Figure 2:
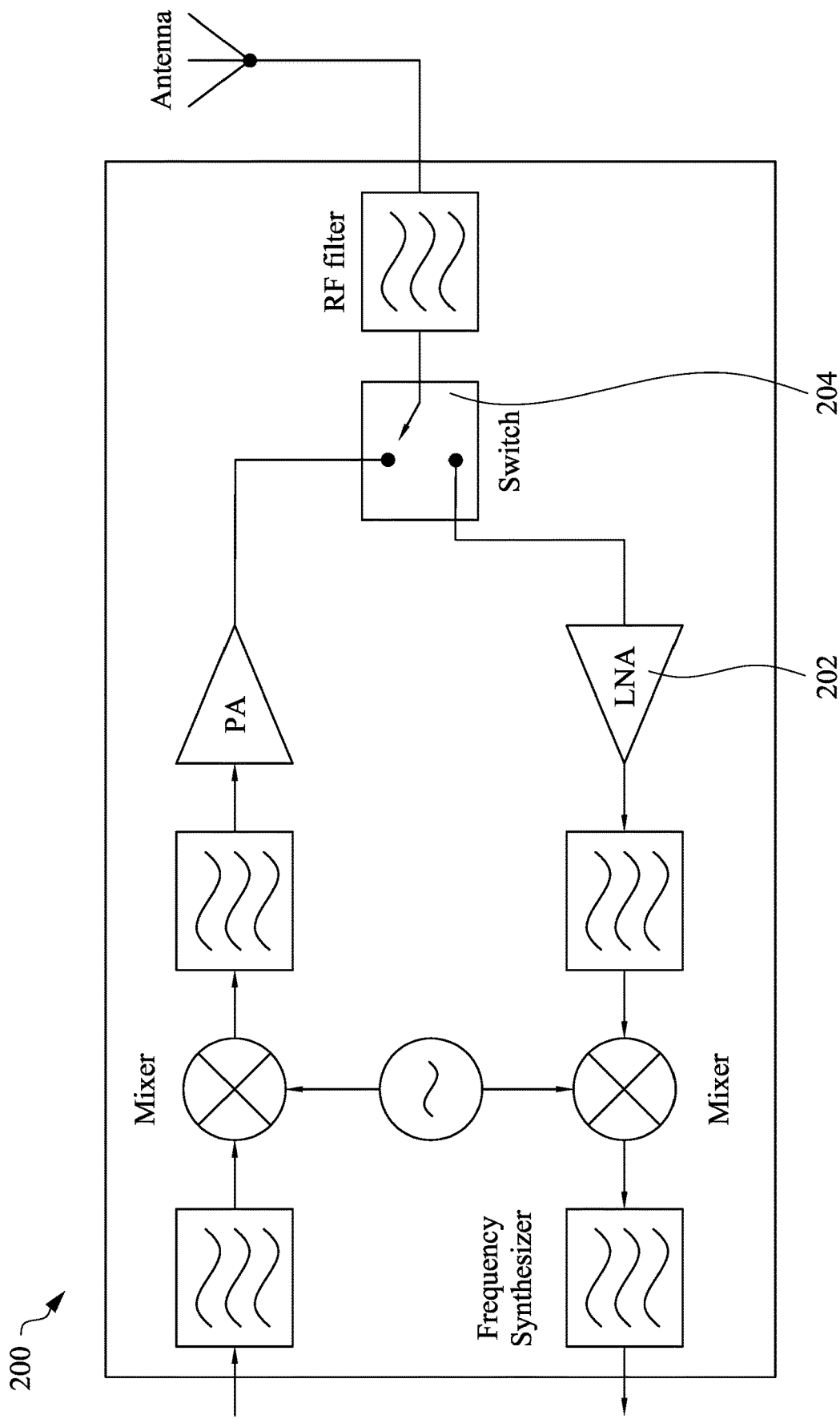
FIG. 2 is a circuit diagram of an RF Front End Module, in accordance with some embodiments.

FIG. 2 is a circuit diagram of an RF Front End Module 200, in accordance with some embodiments. As shown in FIG. 2, the RF Front End Module 200 includes a low-noise amplifier (LNA) 202 and a switch 204, among other components. In some embodiments, the airgap 160 may be utilized in the LNA 202 and the switch 204 to reduce off-state capacitance to improve RC delay performance. The airgap 160 may be formed in the minimum spacing between adjacent metal lines, such as parallel metal lines, vertical metal liners, or metal corner areas, where the parasitic capacitance may be at the highest. The minimum spacing between adjacent metal lines may be based on the lithography capabilities. In some embodiments, the airgap 160 may be formed in spacing between adjacent metal lines that is substantially greater than the minimum spacing.

Figure 3:
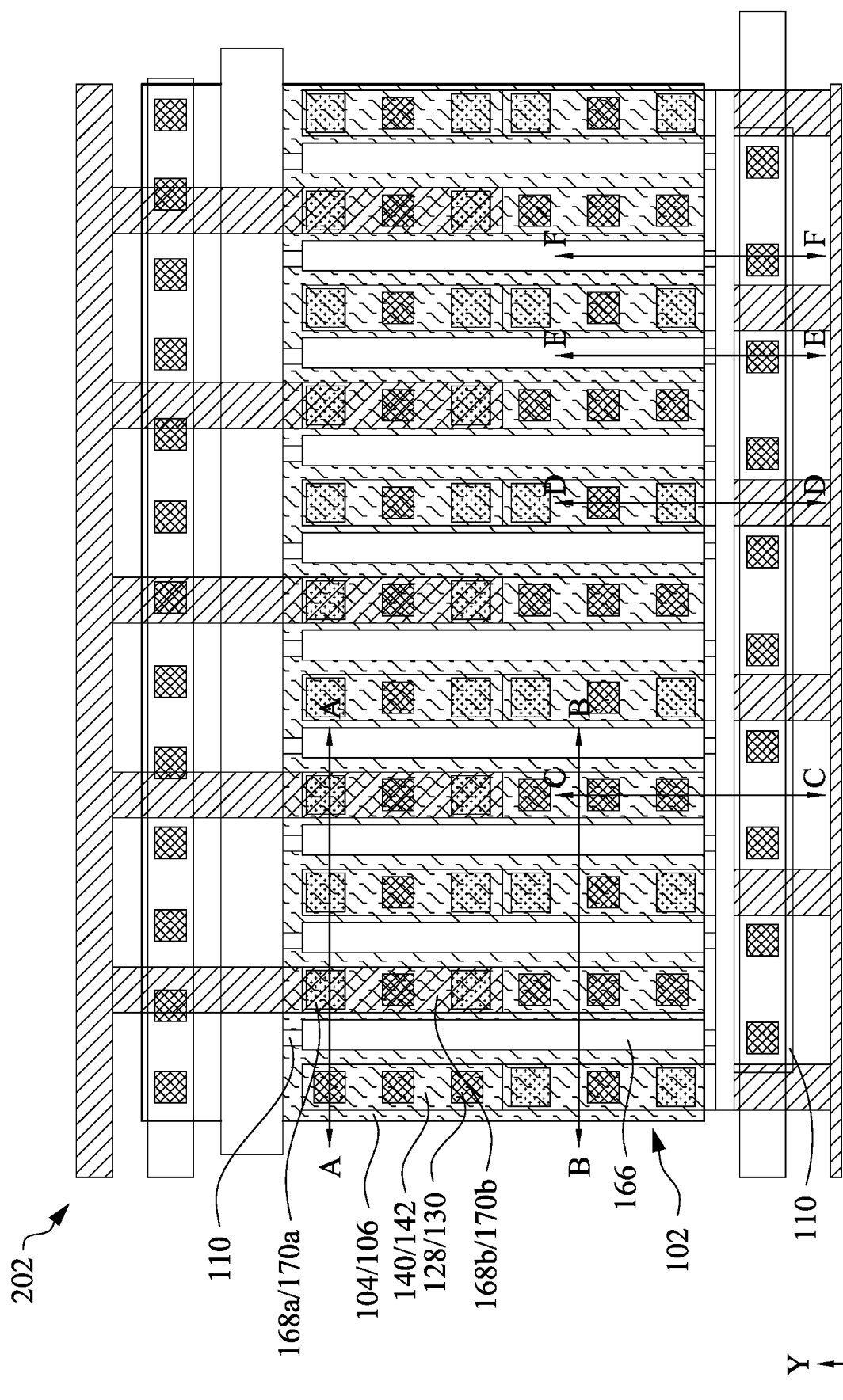
FIG. 3 is a top view of a low-noise amplifier of the RF Front End Module of FIG. 2, in accordance with some embodiments.

FIG. 3 is a top view of the LNA 202 of the RF Front End Module 200 of FIG. 2, in accordance with some embodiments. As shown in FIG. 3, the LNA 202 includes the plurality of gate electrode layers 110, the dielectric layer 166 (or the top dielectric layer of the interconnect structure) disposed over the gate electrode layers 110, the source regions/drain regions 104/106, the conductive contacts 128, 130 disposed over the source regions/drain regions 104/106, the conductive features 140, 142 disposed over the conductive contacts 128, 130, the conductive features 168a, 170a disposed over the conductive features 140, 142, and the conductive features 168b, 170b disposed over the conductive features 168a, 170a. As shown in FIG. 3, the gate electrode layers 110, the source regions 104, and the drain regions 106 located in the center of the structure may form the plurality of devices 102. In some embodiments, as shown in FIG. 3, the gate electrode layers 110 are connected at the bottom of the structure and are electrically connected to a plurality of conductive features.

Figure 4A:
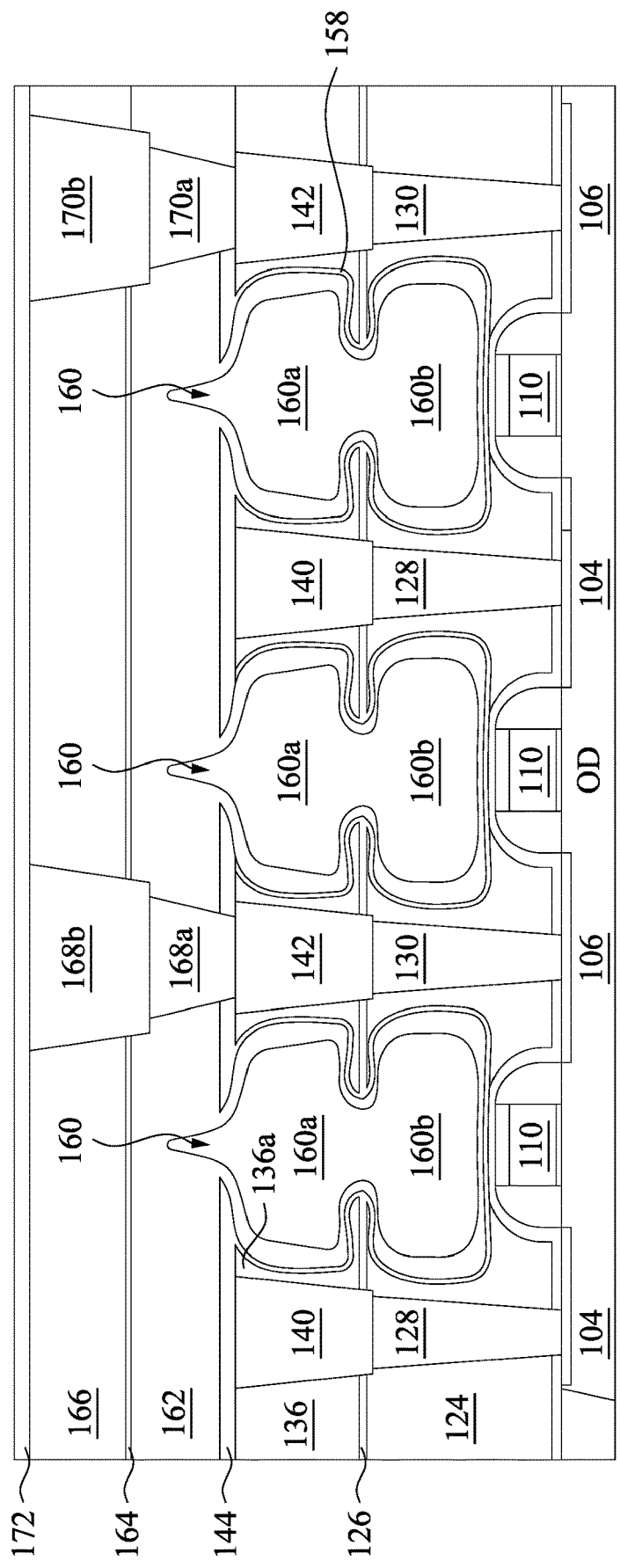
FIGS. 4A-4F are cross-sectional side views of the low-noise amplifier of FIG. 3 taken at cross-sections A-A, B-B, C-C, D-D, E-E, F-F, respectively, in accordance with some embodiments.
Figure 4B:
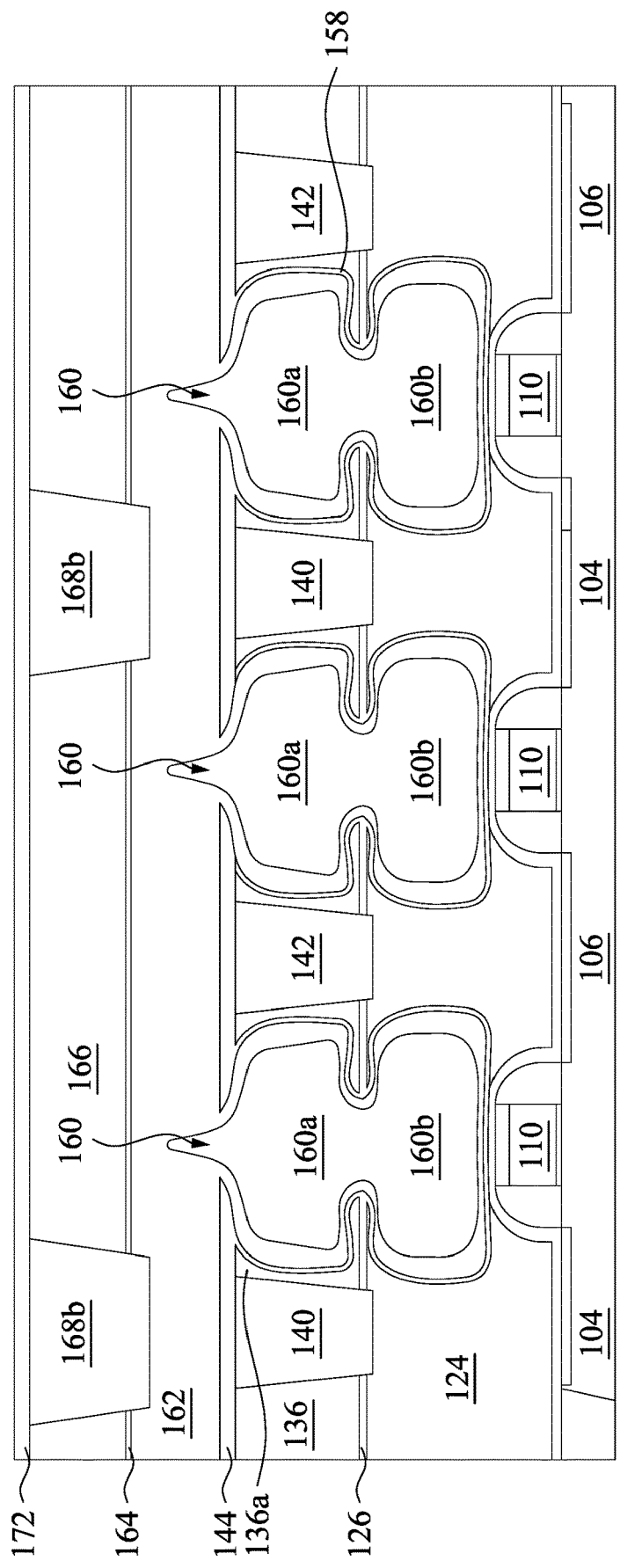

FIGS. 4A-4F are cross-sectional side views of the low-noise amplifier of FIG. 3 taken at cross-sections A-A, B-B, C-C, D-D, E-E, F-F, respectively, in accordance with some embodiments. As shown in FIG. 4A, the airgaps 160 are formed between adjacent conductive features 140, 142 and between adjacent conductive contacts 128, 130. Each airgap 160 includes the portion 160a and the portion 160b. The enlarged portion 160b further reduces off-state capacitance. The portions 136a of the dielectric layer 136 protects the conductive features 140, 142 during the etch process to enlarge the opening 146. As shown in FIG. 4A, the airgaps 160 may be formed in spacings between adjacent conductive features 140, 142 and adjacent conductive contacts 128, 130. In some embodiments, the airgaps 160 are formed in a region without the conductive contacts 128, 130, as shown in FIG. 4B. In addition, the conductive features 168a, 170a, 170b may not present in the region shown in FIG. 4B.

Figure 4C:
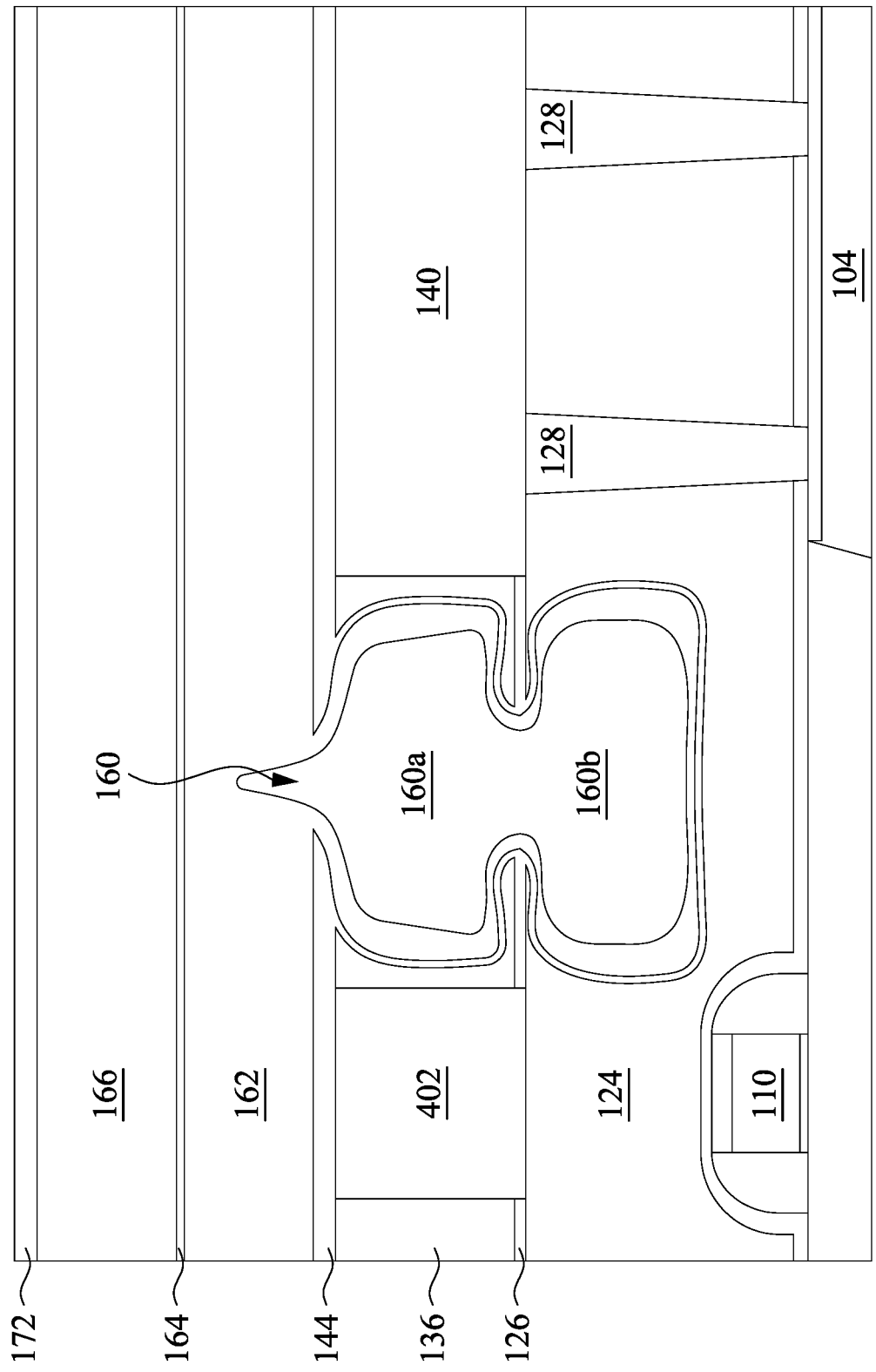
Figure 4D:
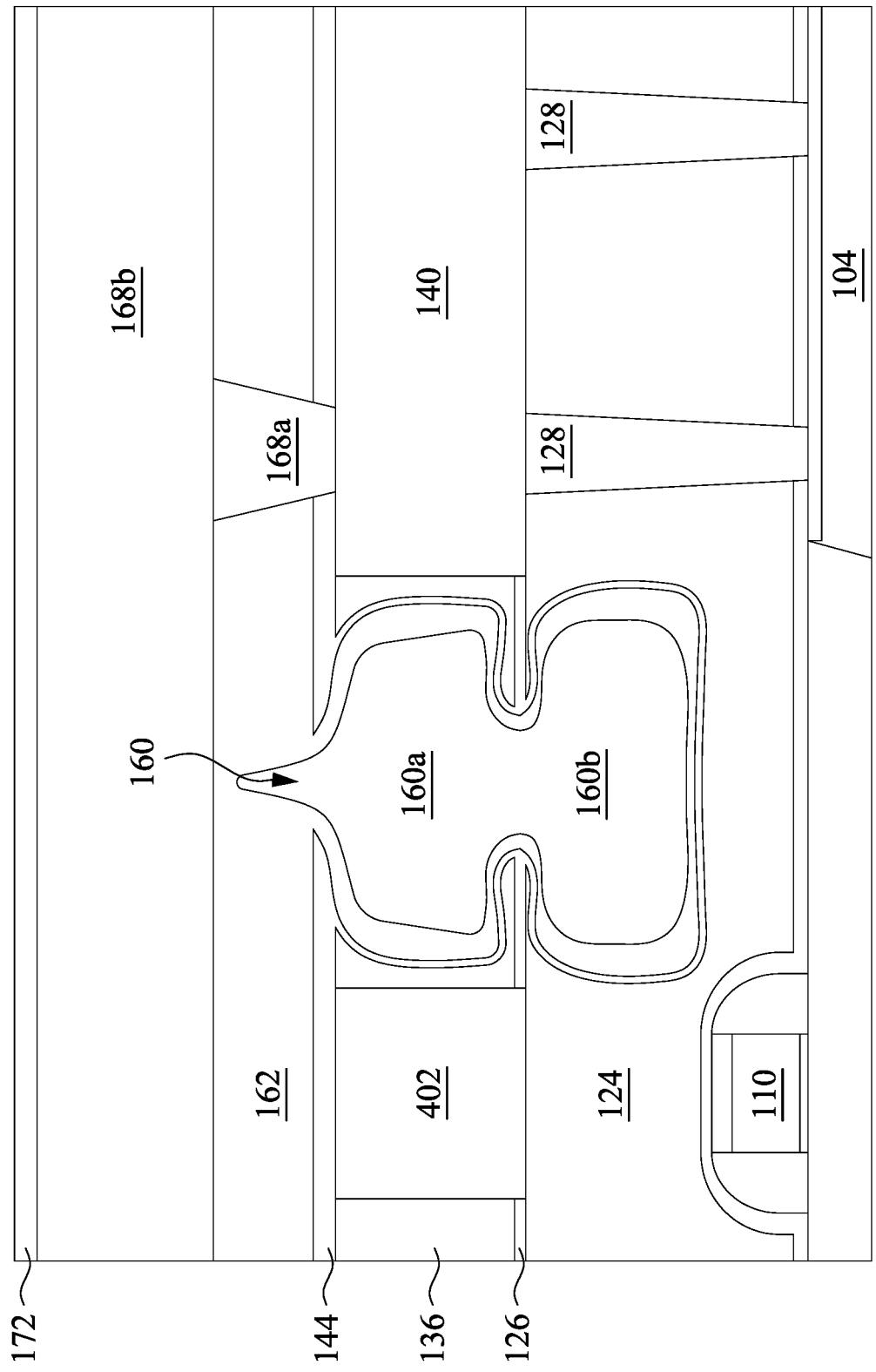

In some embodiments, the airgap 160 is formed between the portion of the gate electrode layer 110 located at the bottom of the structure and the plurality of devices 102. The gate electrode layer 110 may be electrically connected to a conductive feature 402 at a different location along the x-axis. As shown in FIG. 4C, the airgap 160 may be formed in spacing between the conductive features 402, 140. As shown in FIG. 4D, the conductive feature 168a is disposed on the conductive feature 140, and the conductive feature 168b is disposed on the conductive feature 168a.

Figure 4E:
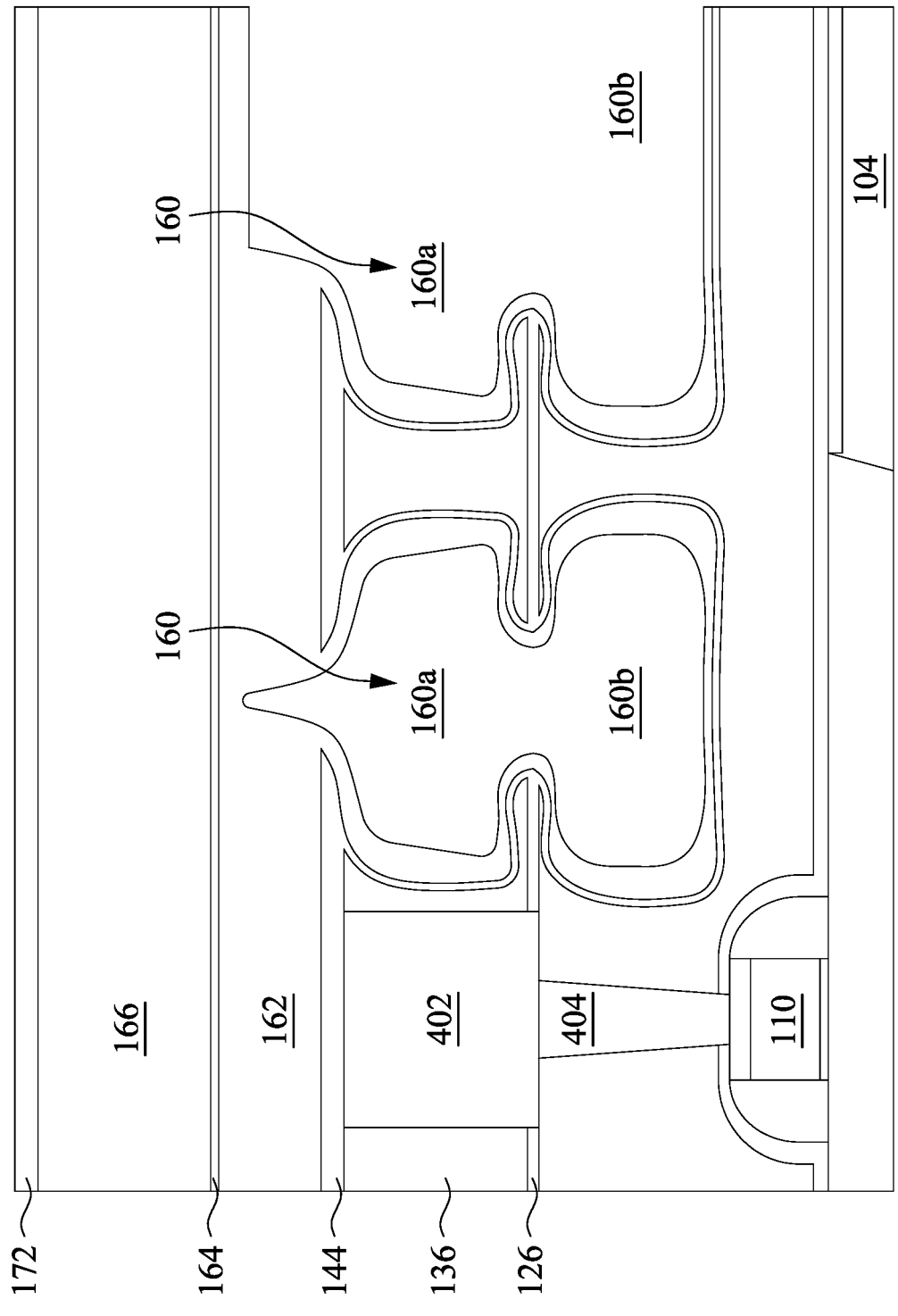
Figure 4F:
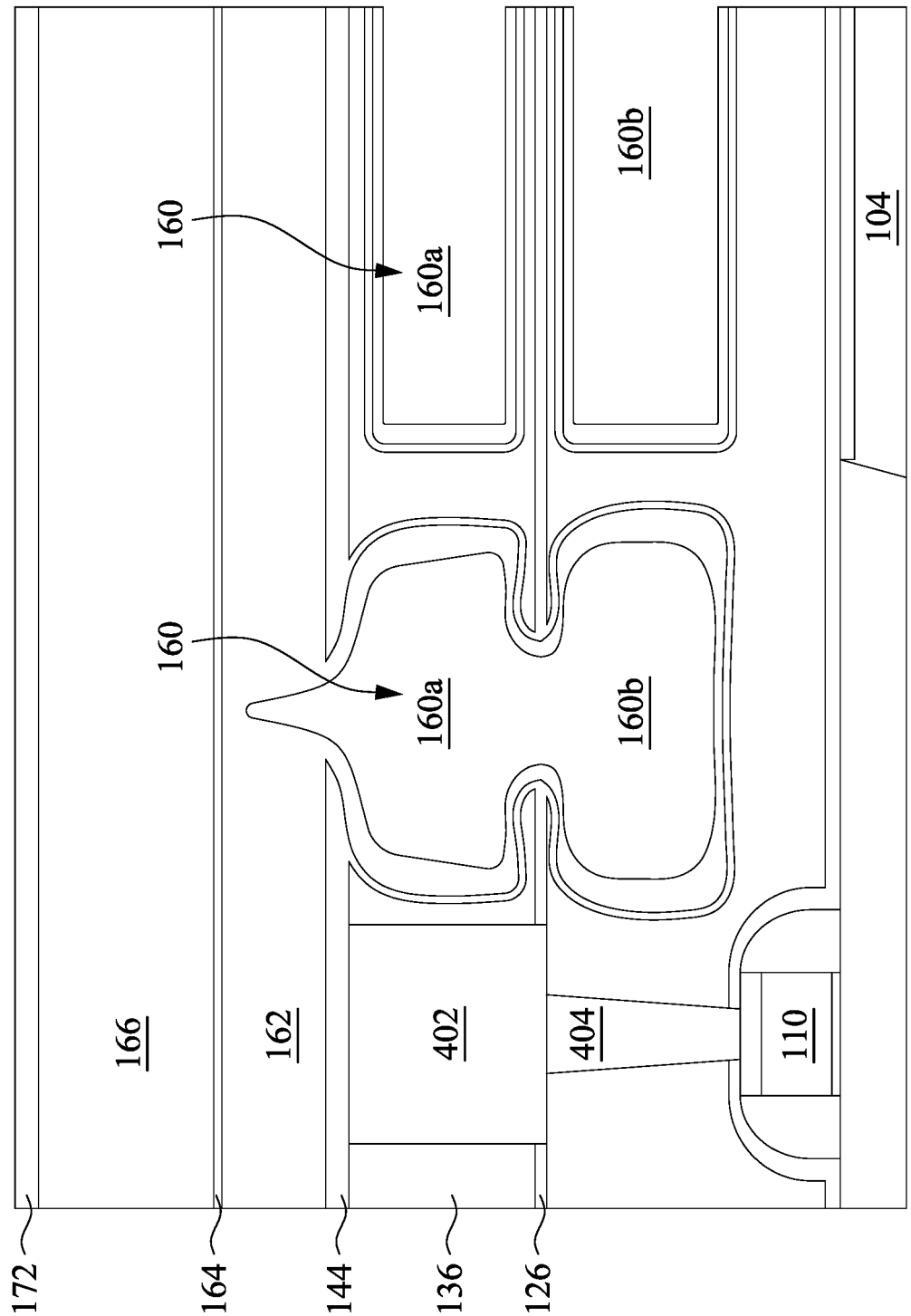

As shown in FIGS. 4E and 4F, the gate electrode layer 110 is connected to the conductive feature 402 via a conductive contact 404. A first airgap 160 is disposed between the gate electrode layer 110 and the plurality of devices 102 (FIG. 3), and a second airgap 160 is disposed between adjacent conductive contacts 128, 130 (FIG. 3), as shown in FIGS. 4E and 4F. The shapes of the second airgap 160 shown in FIGS. 4E and 4F may be slightly different.

Figure 5:
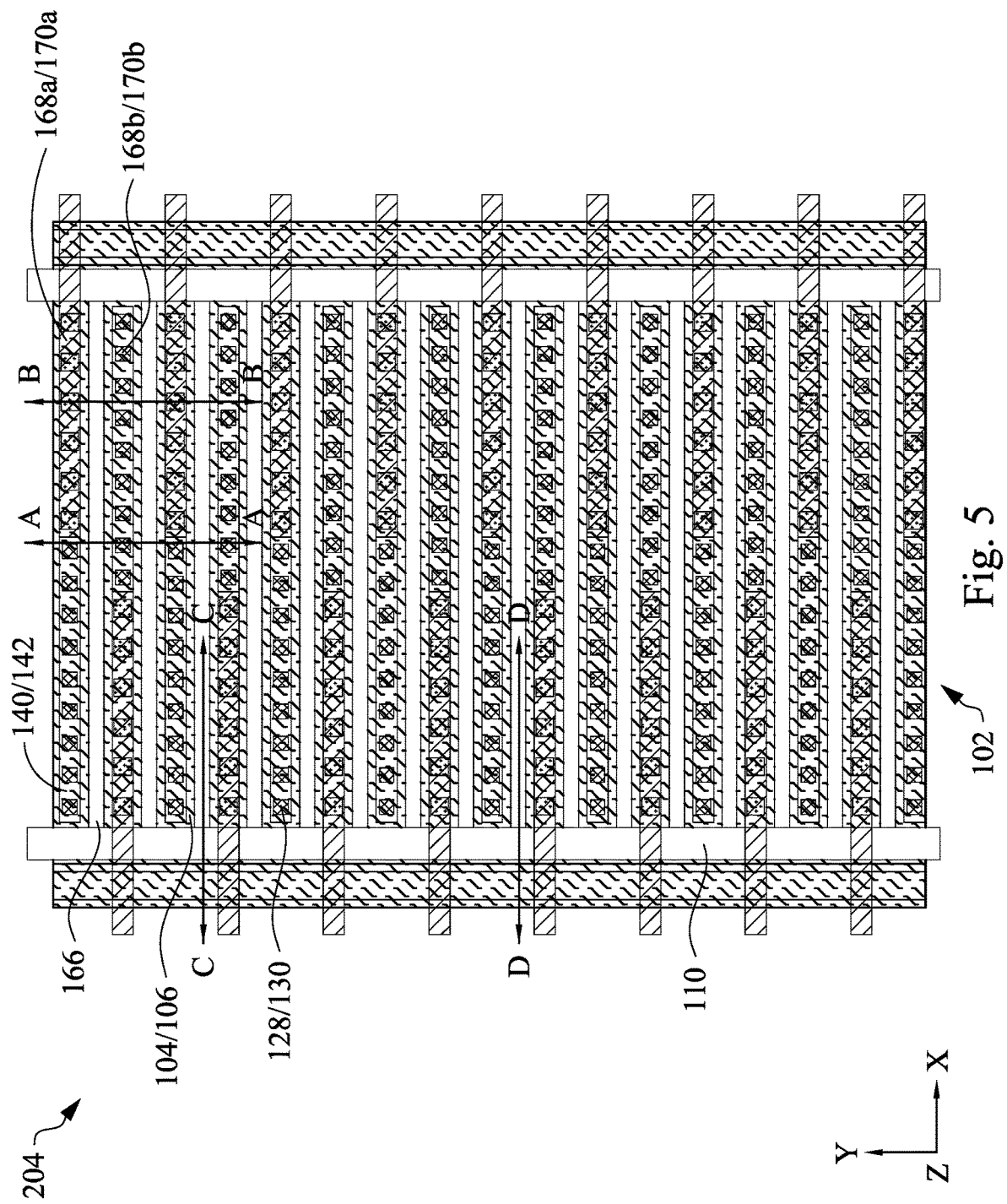
FIG. 5 is a top view of a switch of the RF Front End Module of FIG. 2, in accordance with some embodiments.

FIG. 5 is a top view of the switch 204 of the RF Front End Module 200 of FIG. 2, in accordance with some embodiments. As shown in FIG. 5, the switch 204 includes the plurality of gate electrode layers 110, the dielectric layer 166 (or the top dielectric layer of the interconnect structure) disposed over the gate electrode layers 110, the source regions/drain regions 104/106, the conductive contacts 128, 130 disposed over the source regions/drain regions 104/106, the conductive features 140, 142 disposed over the conductive contacts 128, 130, the conductive features 168a, 170a disposed over the conductive features 140, 142, and the conductive features 168b, 170b disposed over the conductive features 168a, 170a. As shown in FIG. 5, the gate electrode layers 110, the source regions 104, and the drain regions 106 located in the center of the structure may form the plurality of devices 102. In some embodiments, as shown in FIG. 5, the gate electrode layers 110 are connected at the sides of the structure and are electrically connected to a plurality of conductive features.

Figure 6A:
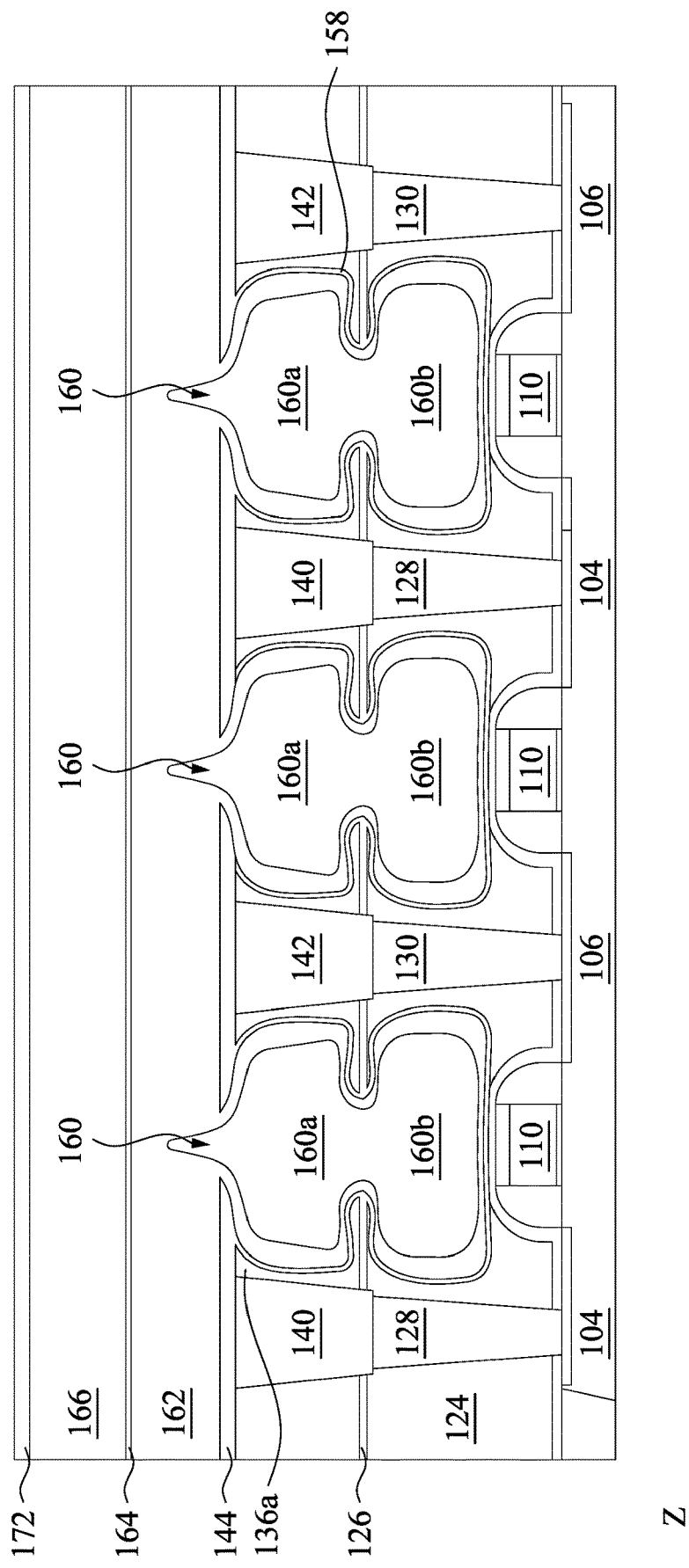
FIGS. 6A-6D are cross-sectional side views of the switch of FIG. 5 taken at cross-sections A-A, B-B, C-C, D-D, respectively, in accordance with some embodiments.
Figure 6B:
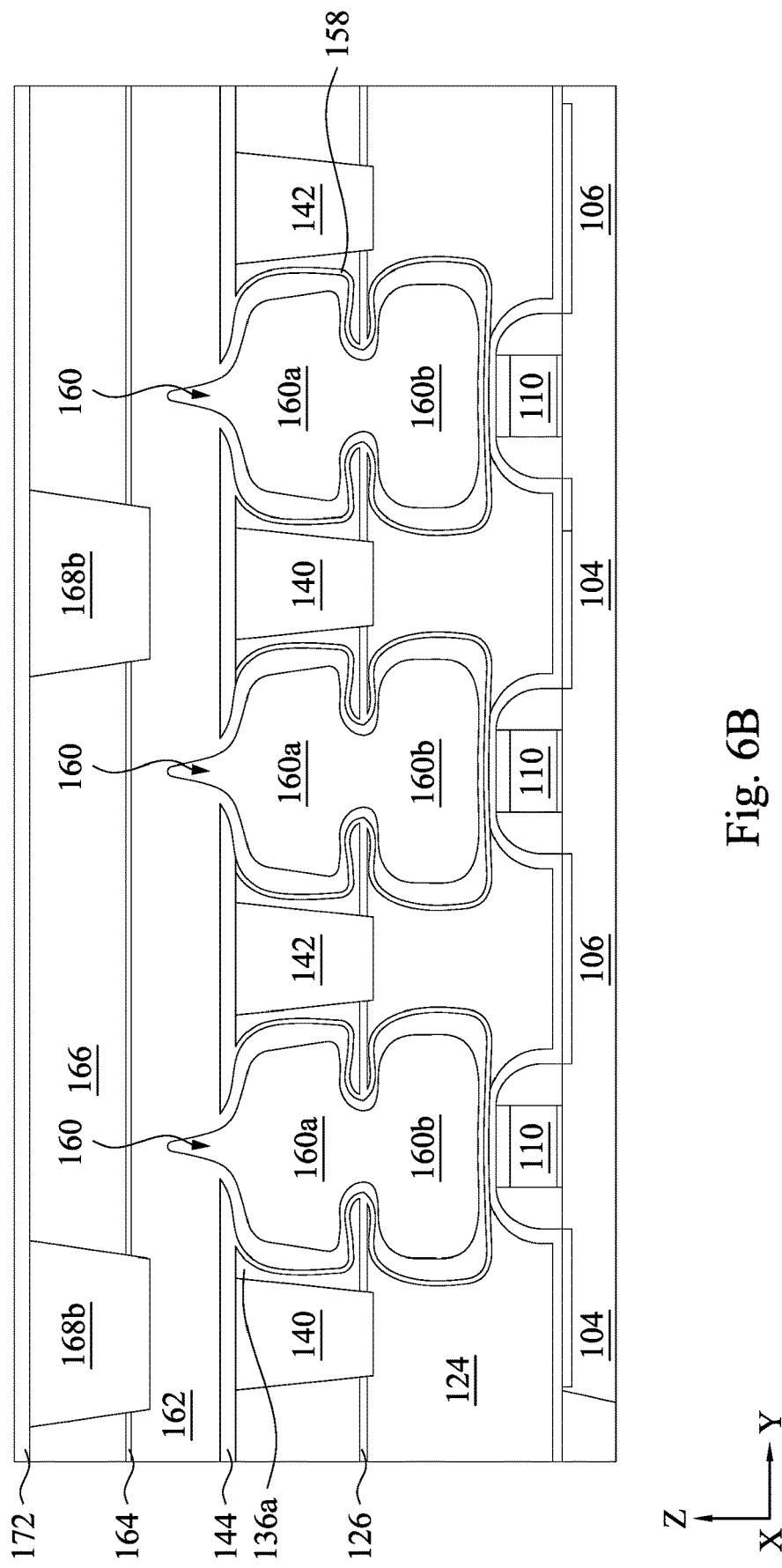

FIGS. 6A-6D are cross-sectional side views of the switch 204 of FIG. 5 taken at cross-sections A-A, B-B, C-C, D-D, respectively, in accordance with some embodiments. As shown in FIG. 6A, the airgaps 160 are formed between adjacent conductive features 140, 142 and between adjacent conductive contacts 128, 130. Each airgap 160 includes the portion 160a and the portion 160b. The enlarged portion 160b further reduces off-state capacitance. The portions 136a of the dielectric layer 136 protects the conductive features 140, 142 during the etch process to enlarge the opening 146. As shown in FIG. 6A, the airgaps 160 may be formed in minimum spacings between adjacent conductive features 140, 142 and adjacent conductive contacts 128, 130. In some embodiments, the airgaps 160 are formed in a region without the conductive contacts 128, 130, as shown in FIG. 6B. In addition, the conductive features 168a, 170a, 170b may not present in the region shown in FIG. 6B.

Figure 6C:
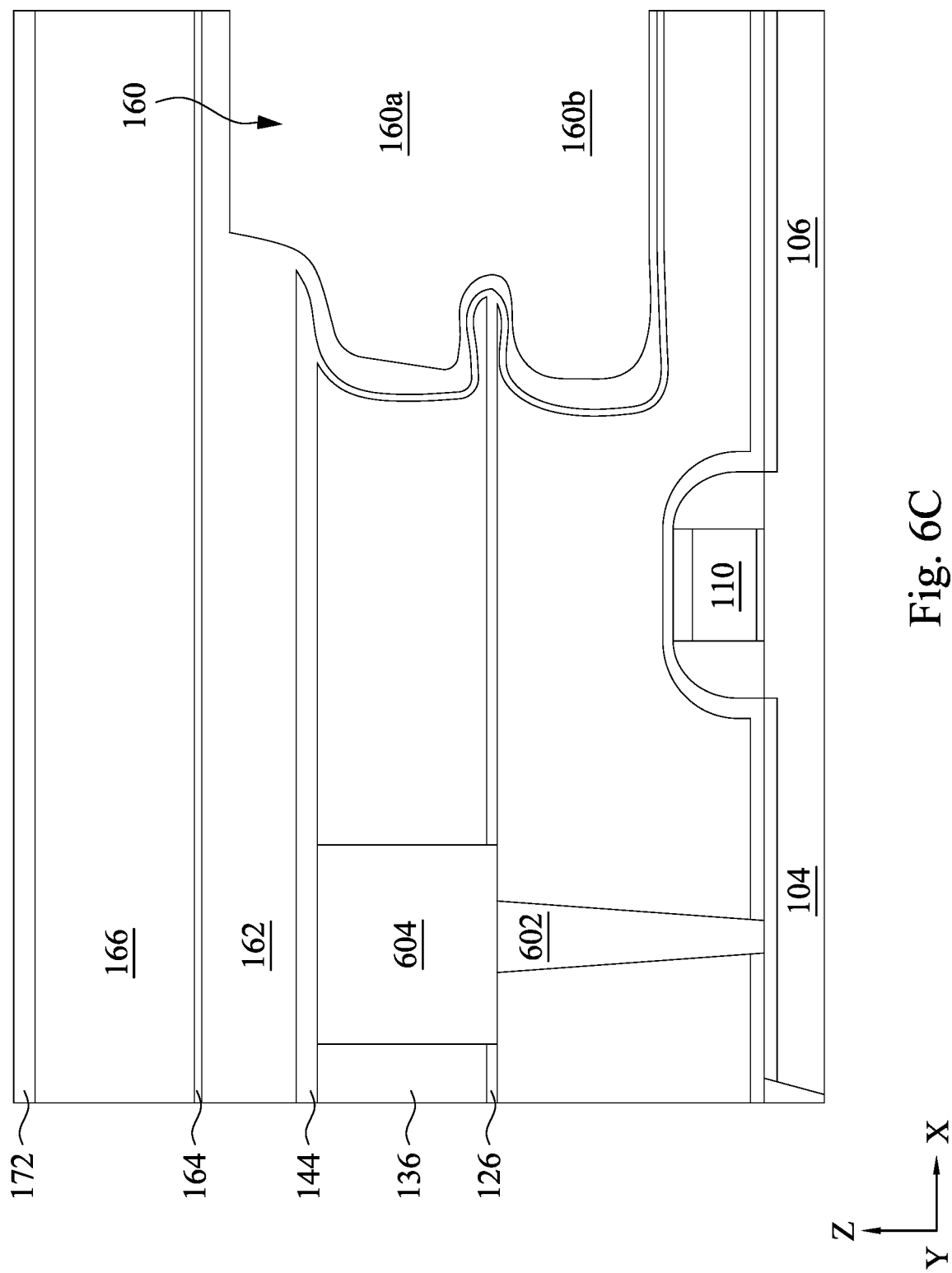
Figure 6D:
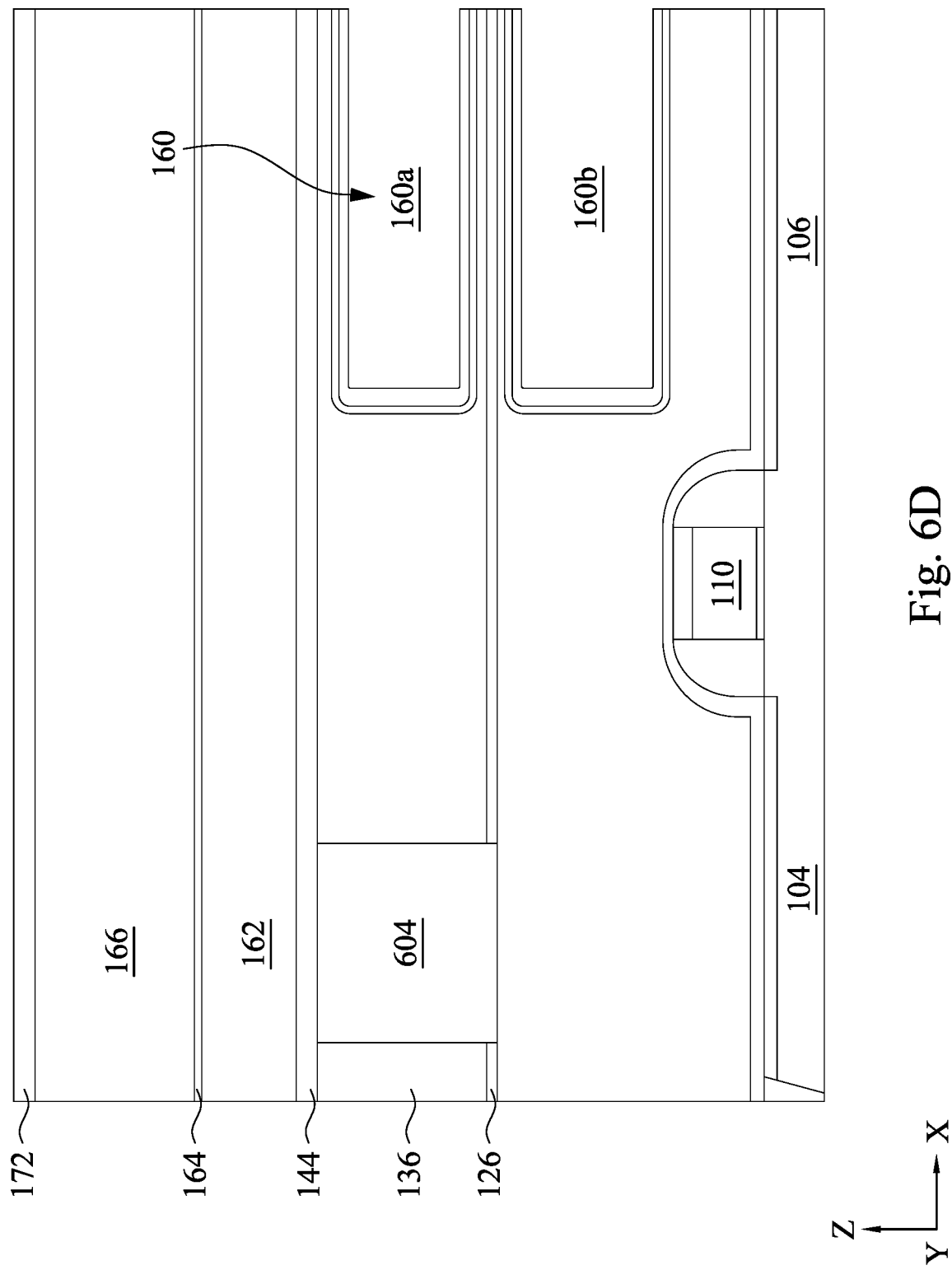

In some embodiments, the airgap 160 is disposed over the drain region 106, as shown in FIGS. 6C and 6D. The airgap 160 may be disposed over the source region 104, in some embodiments. As shown in FIG. 6C, the source region 104 is electrically connected to a conductive contact 602, which is electrically connected to a conductive feature 604. The conductive contact 602 may not be shown in the region shown in FIG. 6D. The shapes of the airgap 160 shown in FIGS. 6E and 6F may be slightly different.

The present disclosure in various embodiments provides a semiconductor device structure and methods of forming the same. In some embodiments, the semiconductor device structure 100 includes a portion 136a of the dielectric layer 136 in contact with a conductive feature 140 during an etch process. Furthermore, a portion 160b of an airgap 160 is enlarged as a result of having a nitride layer 148 formed in an opening 146. Some embodiments may achieve advantages. For example, the portion 136a of the dielectric layer 136 protects the conductive feature 140 from the etchant during the etch process. As a result, conductive feature peeling is avoided. In addition, the enlarged portion 160b further reduces off-state capacitance, leading to improved RC delay performance.

An embodiment is a semiconductor device structure. The structure includes a device and a first dielectric layer disposed over the device. An airgap is located in the first dielectric layer. The structure further includes a conductive feature disposed in the first dielectric layer, and the first dielectric layer includes a first portion disposed between the airgap and a first side of the conductive feature and a second portion disposed adjacent a second side of the conductive feature opposite the first side. The first portion has a first nitrogen concentration, and the second portion has a second nitrogen concentration substantially less than the first nitrogen concentration.

Another embodiment is a semiconductor device structure. The structure includes a device, a first dielectric layer disposed over the device, and a first etch stop layer disposed on the first dielectric layer. The first etch stop layer includes a first portion having a first nitrogen concentration and a second portion having a second nitrogen concentration substantially less than the first nitrogen concentration. The structure further includes a second dielectric layer disposed on the first etch stop layer, and an airgap is located in the first and second dielectric layers. The structure further includes a second etch stop layer disposed on the second dielectric layer, and the second etch stop layer includes a first portion having a third nitrogen concentration and a second portion having a fourth nitrogen concentration substantially less than the third nitrogen concentration.

A further embodiment is a method. The method includes depositing a first dielectric layer over a device, forming two conductive contacts in the first dielectric layer, depositing a second dielectric layer over the first dielectric layer, forming two conductive features in the second dielectric layer, forming an opening in the first and second dielectric layers, performing a treatment process on the first and second dielectric layers to convert an exposed portion of the first dielectric layer in the opening to a first nitride layer and to convert an exposed portion of the second dielectric layer in the opening to a second nitride layer, and enlarging the opening by removing the first and second nitride layers and portions of the first and second dielectric layers.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The invention claimed is:

1. A method, comprising:
depositing a first dielectric layer over a device;
forming two conductive contacts in the first dielectric layer;
depositing a second dielectric layer over the first dielectric layer;
forming two conductive features in the second dielectric layer;
forming an opening in the first and second dielectric layers;
performing a treatment process on the first and second dielectric layers to convert an exposed portion of the first dielectric layer in the opening to a first nitride layer and to convert an exposed portion of the second dielectric layer in the opening to a second nitride layer; and
enlarging the opening by removing the first and second nitride layers and portions of the first and second dielectric layers.

2. The method of claim 1, further comprising:
depositing a first etch stop layer on the first dielectric layer, wherein the second dielectric layer is deposited on the first etch stop layer; and
depositing a second etch stop layer on the second dielectric layer.

3. The method of claim 2, wherein the opening is formed in the first and second etch stop layers.

4. The method of claim 3, wherein the treatment process increases a nitrogen concentration in an exposed portion of the first and second etch stop layers in the opening.

5. The method of claim 1, wherein a thickness of the first nitride layer is less than a thickness of the second nitride layer.

6. A method, comprising:
forming a transistor over a substrate;
depositing a first dielectric layer over the transistor;
depositing a second dielectric layer over the first dielectric layer;
forming an opening in the first and second dielectric layers;
forming a first nitride layer on a sidewall of the first dielectric layer and a second nitride layer on a sidewall of the second dielectric layer, wherein a thickness of the first nitride layer is less than a thickness of the second nitride layer; and
enlarging the opening by removing the first and second nitride layers and portions of the first and second dielectric layers.

7. The method of claim 6, wherein the first and second dielectric layers have different etch rates during an etching process.

8. The method of claim 6, wherein the opening has a first critical dimension in the first dielectric layer and a second critical dimension in the second dielectric layer prior to the forming of the first and second nitride layers.

9. The method of claim 8, wherein the second critical dimension is greater than the first critical dimension.

10. The method of claim 9, wherein the opening has a third critical dimension in the first dielectric layer and a fourth critical dimension in the second dielectric layer after the enlarging of the opening.

11. The method of claim 10, wherein the third critical dimension and the fourth critical dimension are substantially the same.

12. The method of claim 6, further comprising depositing an etch stop layer on the first dielectric layer, wherein the second dielectric layer is deposited on the etch stop layer.

13. The method of claim 12, wherein the opening is formed in the etch stop layer.

14. The method of claim 13, further comprising forming a third nitride layer on a sidewall of the etch stop layer.

15. The method of claim 14, wherein the third nitride layer remains after the enlarging of the opening.

16. A method, comprising:
forming a transistor over a substrate;
depositing a first dielectric layer over the transistor;
depositing a second dielectric layer over the first dielectric layer;
forming an opening in the first and second dielectric layers, wherein the opening has a first critical dimension in the first dielectric layer and a second critical dimension in the second dielectric layer, wherein the first and second critical dimensions are different;
enlarging the opening to have a third critical dimension in the first dielectric layer and a fourth critical dimension in the second dielectric layer, wherein the third and fourth critical dimensions are the same; and
depositing a third dielectric layer to seal the opening, wherein the opening has a fifth critical dimension in the first dielectric layer and a sixth critical dimension in the second dielectric layer, wherein the fifth and sixth critical dimensions are the same, and the fifth critical dimension is less than the third critical dimension.

17. The method of claim 16, further comprising performing a treatment process on the first and second dielectric layers prior to the enlarging of the opening.

18. The method of claim 17, wherein the treatment process comprises exposing the first and second dielectric layers to a nitrogen-containing gas.

19. The method of claim 18, wherein the first and second dielectric layers comprise oxides.

20. The method of claim 19, wherein portions of the first and second dielectric layers are converted to oxynitrides.

* * * * *